(12) United States Patent
Sakaue

(10) Patent No.: US 8,482,794 B2
(45) Date of Patent: Jul. 9, 2013

(54) IMAGE PROCESSING APPARATUS, SPATIAL FREQUENCY CONVERSION METHOD FOR IMAGE PROCESSING APPARATUS AND RECORDING MEDIUM

(75) Inventor: Tsutomu Sakaue, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 719 days.

(21) Appl. No.: 12/707,781

(22) Filed: Feb. 18, 2010

(65) Prior Publication Data

US 2010/0214624 A1 Aug. 26, 2010

(30) Foreign Application Priority Data

Feb. 23, 2009 (JP) ................................. 2009-039888

(51) Int. Cl.
*G06F 3/08* (2006.01)
*H04N 1/60* (2006.01)

(52) U.S. Cl.
USPC ........... 358/1.9; 358/3.07; 358/3.1; 358/3.26; 358/3.27; 358/504; 358/518; 358/521

(58) Field of Classification Search
USPC ................... 358/1.9, 3.26–3.27; 382/254–269
See application file for complete search history.

(56) References Cited

U.S. PATENT DOCUMENTS

| 4,965,599 | A * | 10/1990 | Roddy et al. | 347/240 |
|---|---|---|---|---|
| 7,626,735 | B2 * | 12/2009 | Mizuhashi et al. | 358/474 |
| 7,872,784 | B2 * | 1/2011 | Sato | 358/518 |
| 7,972,784 | B2 * | 7/2011 | Model | 435/6.11 |
| 8,164,808 | B2 * | 4/2012 | Morikawa | 358/518 |
| 8,373,900 | B2 * | 2/2013 | Morikawa | 358/2.1 |
| 2003/0169442 | A1 * | 9/2003 | Yokochi | 358/1.9 |
| 2008/0088887 | A1 * | 4/2008 | Morikawa | 358/447 |
| 2009/0002784 | A1 * | 1/2009 | Morikawa | 358/520 |
| 2009/0034001 | A1 * | 2/2009 | Shiraishi et al. | 358/2.1 |

FOREIGN PATENT DOCUMENTS

| JP | 2001-285595 | | 10/2001 |
|---|---|---|---|
| JP | 2002-218248 | | 8/2002 |
| JP | 2004-187144 | | 7/2004 |
| JP | 2007325090 A | * | 12/2007 |
| JP | 2008-098921 | | 4/2008 |
| JP | 2008172522 A | * | 7/2008 |

OTHER PUBLICATIONS

Japanese Patent Office machine translations of JP 2007325090 A and JP 2008-172522A.*

* cited by examiner

*Primary Examiner* — Richard Zhu
(74) *Attorney, Agent, or Firm* — Fitzpatrick, Cella, Harper & Scinto

(57) ABSTRACT

An image processing apparatus regardless of usage environment, at any time, for any occasion, without requiring a dedicated chart or device, spatial frequency conversion method and program for the apparatus that can calculate spatial frequency response characteristics necessary for calibration. The apparatus includes first and second image reading units reading a print-out image of a patch image stored in a storage section, and first and second spatial frequency conversion units performing spatial frequency conversion on images read by first and second reading units. Based on the amounts of change, caused through processing by first spatial frequency conversion unit, in spatial frequency response, the apparatus determines a patch image used for spatial frequency conversion, and calculates correction amounts for conversion by first and second spatial frequency conversion units, according to a result of spatial frequency conversion, using the patch image, by first and second spatial frequency conversion units.

12 Claims, 18 Drawing Sheets

1100

| FREQUENCY OF STRIPED PATCH | AFTER PROCESSING (+10%) | AFTER PROCESSING (+20%) | REFERENTIAL OR NOT |
|---|---|---|---|
| 4 lp/mm | +10 % | +20 % | ◎ |
| 6 lp/mm | +10 % | +20 % | ◎ |
| 8 lp/mm | +10 % | +20 % | ◎ |
| 10 lp/mm | +10 % | +20 % | ◎ |

1110

| FREQUENCY OF STRIPED PATCH | AFTER PROCESSING (+10%) | AFTER PROCESSING (+20%) | REFERENTIAL OR NOT |
|---|---|---|---|
| 4 lp/mm | +10 % | +20 % | ◎ |
| 6 lp/mm | +10 % | +20 % | ◎ |
| 8 lp/mm | +8 % | +17 % | ○ |
| 10 lp/mm | +4 % | +7 % | × |

FIG.11

IMAGE PROCESSING APPARATUS, SPATIAL FREQUENCY CONVERSION METHOD FOR IMAGE PROCESSING APPARATUS AND RECORDING MEDIUM

BACKGROUND OF THE INVENTION

1. Field of the Invention

The present invention relates to an image processing apparatus, spatial frequency conversion method for the image processing apparatus and recording medium. The invention particularly relates to an image processing apparatus for performing calibration of spatial frequency conversion on image data having been read from a double sided document sheet, a spatial frequency conversion method applied to the image processing apparatus, and a recording medium storing a program for execution of the spatial frequency conversion on a computer.

2. Description of the Related Art

Conventionally, as image reading units to be used for an image processing apparatus or the like, image reading units that perform so-called "skimming thorough" are known (refer to Japanese Patent Laid-Open No. 2001-285595, for example). With this image reading unit, original document sheets are conveyed one by one by an original document sheet conveying unit onto a glass document table, and the original document sheets are exposed by an exposure unit fixed on the convey path of the conveying unit so that images are read.

Further, there are known image reading units provided with two image reading sections so as to read the front and back sides of an original document sheet (also referred to as an original) in one-time conveyance for improvement of the image reading speed (Refer to Japanese Patent Laid-Open No, 2004-187144, for example).

Such image reading units that read the front and back sides of an original in one-time conveyance include a type having a reduction optical system using a CCD (Charge Coupled Device) line sensor or reduction lens and a type having an equal magnification optical system using a contact type image sensor CIS (Contact Image Sensor). Such an image reading unit causes difference between the front and back sides of an original in the spatial frequency response characteristic and density characteristic. When a difference in spatial frequency response characteristic is caused, a difference is caused between the front and back sides in contrast and the degree of sharpness. Further, even when the same type of an optical system is used to read the front and back sides of an original, a difference in assembling of respective components, spectral characteristic, and the like between optical systems likewise cause a difference in reading characteristic between the front and back sides of an original.

Regarding the spatial frequency response characteristic among the differences in such reading characteristics, there are conventional image reading units that perform adjustment of a reading optical system and/or smoothing filtering processing of read image data (Refer to Japanese Patent Laid-Open No. 2002-218248, for example). Such an image reading unit reduces irregularity in the spatial frequency response characteristic in the same side of an original, and also reduces the difference in spatial frequency response characteristic between the front and back sides of the original.

Further, in order to reduce the irregularity in the spatial frequency response characteristic in the same surface, there are proposed methods that change the spatial frequency response characteristic in filtering processing, corresponding to the position in a surface (refer to Japanese Patent Laid-Open No. 2008-098921, for example).

However, the conventional image reading units disclosed in the Japanese Patent Laid-Open No. 2002-218248 and Japanese Patent Laid-Open No. 2008-098921 require a special chart for calculation of spatial frequency response characteristic that is necessary for calibration. Further, a unit that reads the chart and analyzes the spatial frequency response characteristic may be necessary. Thus, the environment for executing the calibration of spatial frequency response characteristic is limited. In a case of using a special chart, the spatial frequency response characteristic necessary for calibration is in general calculated at the time of production at or shipment from a factory.

Although there is no problem as long as an image reading unit is always stable, various cases are possible as well as temperature and humidity in terms of the environment where an image processing apparatus is used, and a case may occur where calibration has bad effects on output image data due to variation in usage environment and secular change. In particular, in a case of an image reading unit that reads the front and back sides of a sheet in one conveyance, it is possible that the variation amounts due to the usage environment and secular change are different between two devices, which causes a problem that adjustment at the shipment from a factory does not achieve sufficient calibration. Therefore, a method is desired that calculates a spatial frequency response characteristic/characteristics necessary for calibration, without requiring a dedicated chart or device under any usage environment and at any time.

The present invention has been developed in view of the above-described problems. An object of the invention is to provide an image processing apparatus, spatial frequency conversion method for the image processing apparatus and program that do not require a dedicated chart or device under any usage environment and at any time and are able to calculate a spatial frequency response characteristic/characteristics necessary for calibration.

SUMMARY OF THE INVENTION

An image processing apparatus in accordance with the invention includes: a first reading unit configured to read a plurality of patch images formed by an image forming device, the patch images respectively having different frequency characteristics; a second reading unit configured to read the patch images formed by the image forming device; a first spatial frequency conversion unit configured to perform spatial frequency conversion of the read images having been read by the first reading unit; a second spatial frequency conversion unit configured to perform spatial frequency conversion of the read images having been read by the second reading unit; a determination unit configured to determine a patch image to be used for spatial frequency conversion among the plurality of patch images, based on amounts of change in respective spatial frequency responses of the read images related to the plurality of patch images, the amounts of change being due to the spatial frequency conversion by the first spatial frequency conversion unit; and a calculation unit configured to calculate correction amounts for conversion by the first and second spatial frequency conversion units, according to a difference between, a spatial frequency response of a read image that is obtained by the first reading unit reading a print image of the patch image that the determination unit has determined and by the first spatial frequency conversion unit converting the read print image, and a spatial frequency response of a read image that is obtained by the second reading unit reading the print image of the patch image that the determination unit has determined and by the second spatial frequency conversion unit converting the read print image, the calculation unit calculating the correction amounts such that the both spatial frequency responses become comparable with each other.

In accordance with the invention, regardless of the usage environment, at any time, for any occasion, and without requiring a dedicated chart or device, it is possible to provide an image processing apparatus, a spatial frequency conversion method and a program for the image processing apparatus that are capable of calculating spatial frequency response characteristics necessary for calibration.

Further features of the present invention will become apparent from the following description of exemplary embodiments (with reference to the attached drawings).

BRIEF DESCRIPTION OF THE DRAWINGS

FIG. 11 shows an example of the amounts of change in spatial frequency response before and after spatial frequency conversion in accordance with the present embodiment;

DESCRIPTION OF THE EMBODIMENTS

Figure 1:
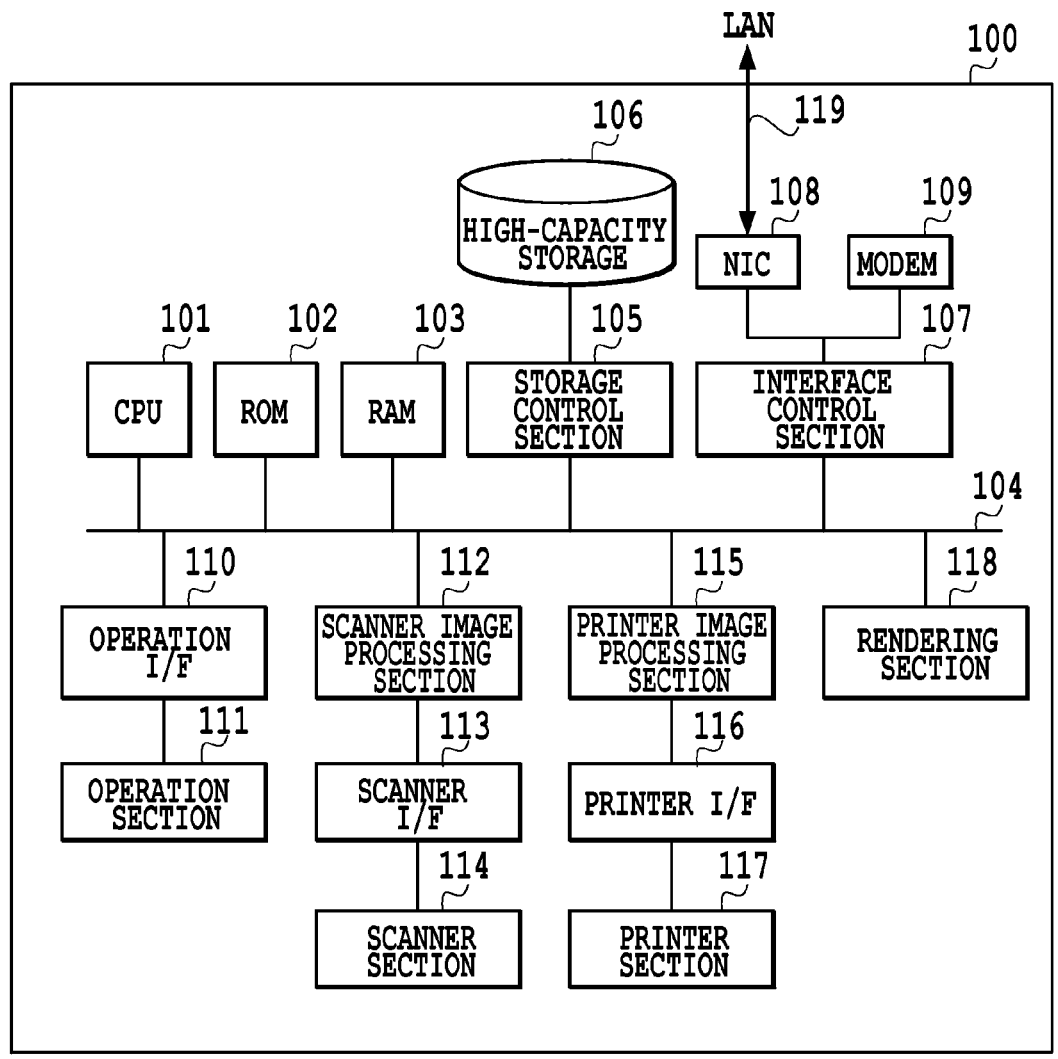
FIG. 1 is a diagram showing hardware configuration of an image processing apparatus in accordance with a present embodiment.

Best modes for carrying out the invention will be described below, referring to the drawings. However, the description of these embodiments is exemplary, and the scope of the invention is not limited to these embodiments.

First Embodiment

Description of System Configuration of an Image Processing Apparatus in the Present Embodiment FIG. 1 is a block diagram showing the configuration of an image processing apparatus in accordance with the present embodiment. A CPU 101 is a controller for controlling the entirety of an image processing apparatus 100. The CPU 101 initiates an OS (Operating System) by a boot program stored in a ROM 102. The CPU 101 executes on this OS a controller program and various application programs stored in a high-capacity storage 106. The CPU 101 is connected with respective sections via inner buses including a data bus 104.

A RAM 103 operates as a temporary storage area, such as a main memory, work area, or the like for the CPU 101. Further, the RAM 103 is used also as a temporary storage area for image processing. A storage control section 105 controls storing of data, reading of data, and the like for the high-capacity storage 106. An interface control section 107 controls network I/Fs including NIC (network Interface Card) 108, and performs transmitting and receiving of various data including image data, for a network, such as a LAN. Further, the interface control section 107 controls a modem 109 to transmit and receive data to and from telephone lines. Operational instructions by a user are input from an operation section 111, such as a touch panel or hard keys, via an operation I/F 110. Further, the operation I/F 110 controls the operation section 111, such as a LCD or CRT, to display an operation screen for the user.

A scanner image processing section 112 performs calibrating, processing, and editing of image data received from a scanner section 114 via a scanner I/F 113. The scanner image processing section 112 determines whether the received image data is of a color original, monochrome original, text original, photograph original or the like. Then, the result of determination is attached to the image data. Such attached information is referred to as attribute data.

A printer image processing section 115 performs image processing, for print output, on image data processed by the scanner image processing section 112, or bit map data processed by a later-described rendering section 118. Then, the printer image processing section 115 transmits the generated bit map data to a printer section 117 (an image forming unit) via a printer I/F 116.

The rendering section 118 generates bit map data that becomes a print image. Print data transmitted from a personal computer or the like, not shown, via a network is input to the image processing apparatus 100 via a LAN 119. The input print data is converted by the CPU 101 into a display list and then transmitted to the rendering section 118. The rendering section 118 interprets the display list data converted by the CPU 101 and generates bit map data.

<Description of an Image Reading Unit in the Present Embodiment>

Figure 2:
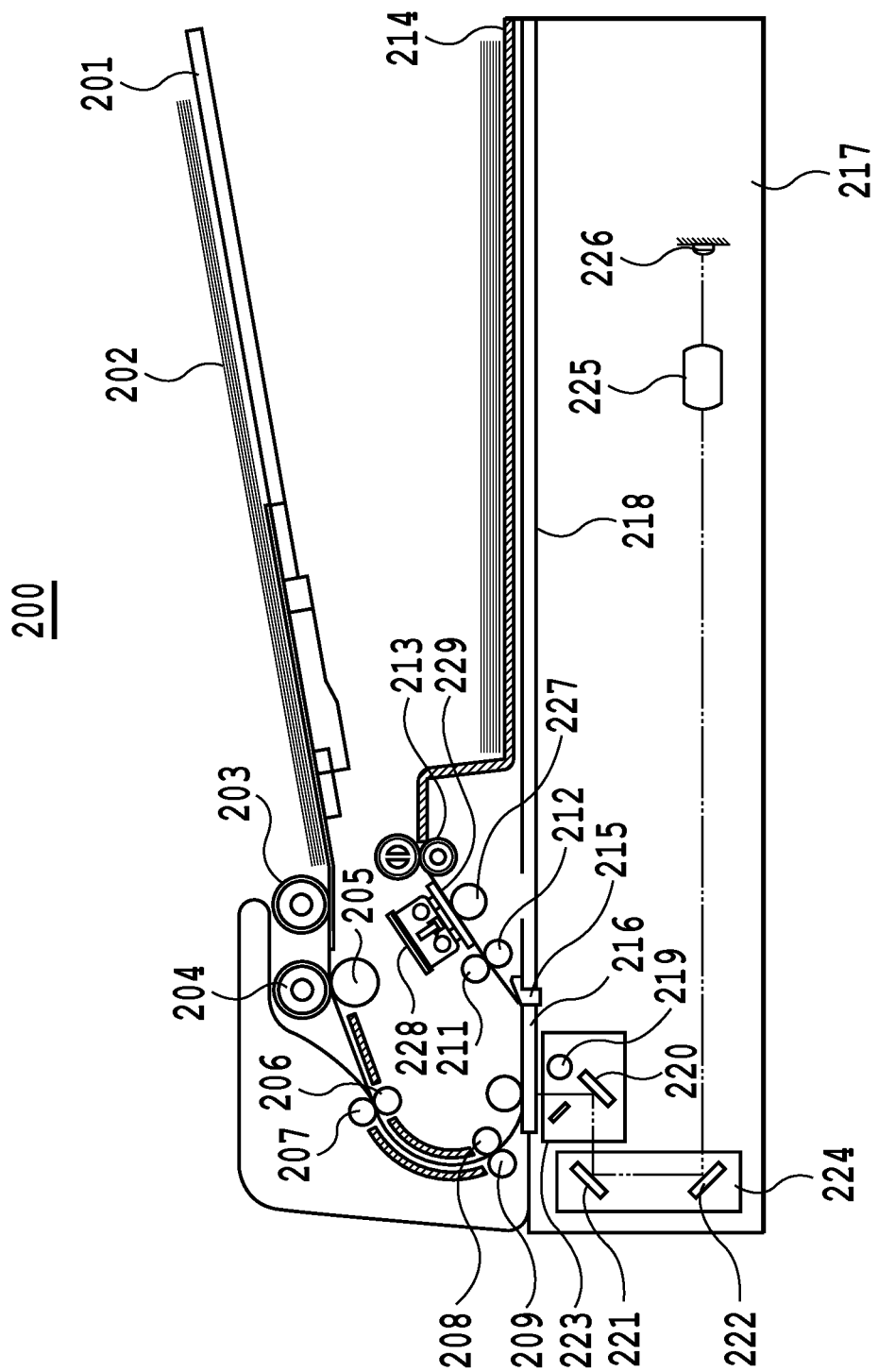
FIG. 2 is a configuration diagram of an image reading unit in accordance with the present embodiment.
Figure 3:
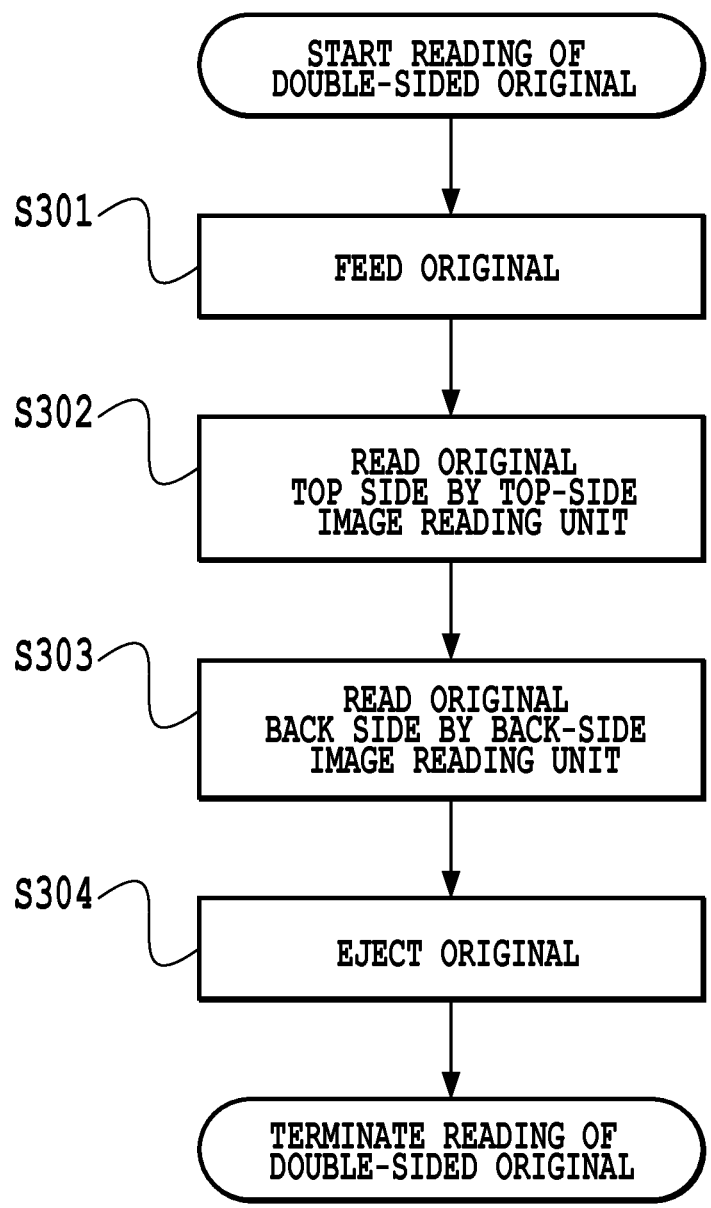
FIG. 3 is a reading flow chart for the image reading unit in accordance with the present embodiment.

FIG. 2 is a side view showing the configuration of an image reading unit in accordance with the first embodiment of the invention. This image reading unit has an automatic original feeding unit mounted thereon. Further, FIG. 3 is a flowchart showing the procedure of reading operation of a double-sided original performed by the image reading unit shown in FIG. 2. The configuration of the image reading unit will be described below, referring to FIG. 2, and the reading operation of a double-sided original performed by the image reading unit will be described below as necessary, referring to the steps shown in FIG. 3. The scanner section 114 in FIG. 1 includes an automatic original feeding unit 200 and image reading unit 217.

FIG. 2 shows an automatic original feeding unit 200. Originals 202 are mounted on an original tray 201. A sheet feed roller 203 is provided above the original tray 201. The sheet feed roller 203 is connected with the same drive source as a separation convey roller 204 and rotates accompanying the rotation of the separation convey roller 204 to feed originals 202 (step S301).

The sheet feed roller 203 is retreating at an upper position being the home position so as not to disturb setting of the originals 202. When sheet feeding operation is started, the sheet feed roller 203 moves down to come in contact with the top surface of the original documents 202. As the sheet feed roller 203 is axially supported by an arm, not shown, the sheet feed roller 203 is moved up and down by fluctuating motion of the arm. A separation conveyance driven roller 205 is arranged on the side opposite to the separation convey roller 204, and is pressed toward the separation convey roller 204. The separation conveyance driven roller 205 is formed of a rubber material or the like having a friction slightly lower than that of the separation convey roller 204, and collaborates with the separation convey roller 204 to feed the originals 202 fed by the sheet feed roller 203, separating the sheets 202 one by one.

A registration roller 206 and registration driven roller 207 are arranged to align the front end of an original fed by the separation convey roller 204 and separation conveyance driven roller 205. That is, the front end of an original conveyed by the separation convey roller 204 and separation conveyance driven roller 205 is hit against the nip between the stopping registration roller 206 and the registration driven roller 207. Thus, a loop is generated on the original and the front end thereof is aligned. Then, the registration roller 206 and registration driven roller 207 rotate, and a lead roller 208 and lead driven roller 209 convey the original toward a flow reading glass 216. A platen roller 210 is arranged on the side opposite to the flow reading glass 216.

Image information on the top side of the original passing through the flow reading glass 216 is read by a CCD line sensor 226 of an image reading unit 217 (a first reading section) (step S302). When reading of the top side image of the original by the CCD line sensor 226 is completed, a lead ejection roller 211 and lead ejection driven roller 212 convey the original toward a contact type image sensor (CIS) 228. A jump table 215 is arranged to guide the sheet (original) upwards from the flow reading glass 216. A flow reading glass 229 is arranged on the CIS 228, and a platen roller 227 is arranged on the opposite side.

The image information on the back side of the original passing through a flow reading glass 229 is read by a CIS 228 (a second reading section) (step S303). When the CIS 228 has completed reading of the image of the back side of the original, an ejection roller 213 ejects the original onto an ejection tray 214 (step S304).

The image reading unit 217 being the first image reading section includes a lamp 219 for irradiating the face of the original to be read with light, and mirrors 220, 221 and 222 for guiding a reflection light from the original to the CCD line sensor 226. The lamp 219 and mirror 220 are fitted to a first mirror table 223. The mirrors 221 and 222 are fitted to a second mirror table 224.

The mirror tables 223 and 224 are connected with a drive motor (not shown) by wires (not shown), and moved by the rotation drive of the drive motor in parallel along the original table glass 218. Reflection light from the original is guided via the mirrors 220, 221 and 222 to the lens 225 and formed into an image at the light-receiving section of the CCD line sensor 226 by the lens 225. The CCD line sensor 226 photo-electrically converts reflection light having been converted into the image and outputs an electrical signal corresponding to the incident light amount.

The CIS 228 being the second image reading section likewise photo-electrically converts reflection light from the original by a photosensitive device and outputs an electrical signal corresponding to the incident light amount.

With the image reading unit having the above-described configuration, it is possible to read the original in two modes, namely, a fixed original reading mode and a skimming thorough mode. In the fixed original reading mode, the original 202 is mounted on the original table glass 218, and the original is read while the first mirror table 223 and second mirror table 224 are moved along the sub-scanning direction (to the right in the figure). In the flow reading mode, in a state that the first mirror table 223 and the second mirror table 224 are stopped, the original 202 is read at the position of the flow reading glass 216 while the original 202 is conveyed by the original feeding unit 200. In the flow reading mode, it is also possible to read the image information on the back side of the original 202 by the CIS 228 through the flow reading glass 229.

<Description of Problems Caused During Flow Reading>

Using the skimming thorough mode, when the image information on the front and back sides of the original is read, a difference between the reading characteristic of the CCD line sensor 226 and the reading characteristic of the CIS 228 occurs as the difference in density characteristic and spatial frequency response characteristic. Further, even if the reading sensors are of the same type, the same characteristic is not guaranteed due to the variation in manufacturing, variation in assembling and the like of the sensors. Still further, the characteristics may be variable due to the usage environment or secular change. Consequently, even when the front and back sides of the same original are read, there may be a significant difference between the read images.

In particular, in a case of an original that has been subjected to offset printing or the like and has images with halftone dots, a little difference in spatial frequency response characteristic significantly appears as a density difference. Further, in a case where this original is in color, if such a difference in spatial frequency response characteristic is present between the front and back sides of the original, the difference appears as a color difference between the front and back sides of the original. Still further, if the spatial frequency response characteristic is irregular within the same side of the original, density uneven and color irregularity occur within the same side, which has bad effects on the image.

Therefore, when simultaneously reading the images of the front and back sides of an original in the flow reading mode, by reducing the difference in spatial frequency response between the front and back sides, the difference in density, color, sharpness and the like between the front and back sides of the original can be reduced.

A method of reducing the difference in spatial frequency response characteristic between the front and back sides of an original will be described below, referring to concrete examples.

<Description of Spatial Frequency Response Characteristic>

In general, the spatial frequency response characteristic represents the relationship between the spatial frequency and contrast (ratio between brightness and darkness). That is, an image (a waveform striped image) having a certain spatial frequency is read, the contrast of an image reproduced from the obtained image data is measured, and the measured contrast is made associated with the corresponding spatial frequency. If the spatial frequency response characteristic is low, the image becomes blurred. If the spatial frequency response characteristic is high, the sharpness of the image increases.

Although, for precise measurement, it is necessary to use a dedicated chart having a density frequency represented by a sine function "sin" being a trigonometrical function, there is a measuring method that uses a black and white line chart in substitution as a simple measuring method. The method described in Japanese Patent Laid-Open No. 2008-098921 also uses this simple measuring method.

Because the present embodiment is aimed at relatively adjusting the spatial frequency response characteristics of the front and back sides to each other, a simple method that uses a black and white line chart in substitution is basically employed as the measuring method.

<Description of a Patch Image for Detection of Spatial Frequency Response Characteristic, the Patch Image being Used in the Present Embodiment>

Figure 4:
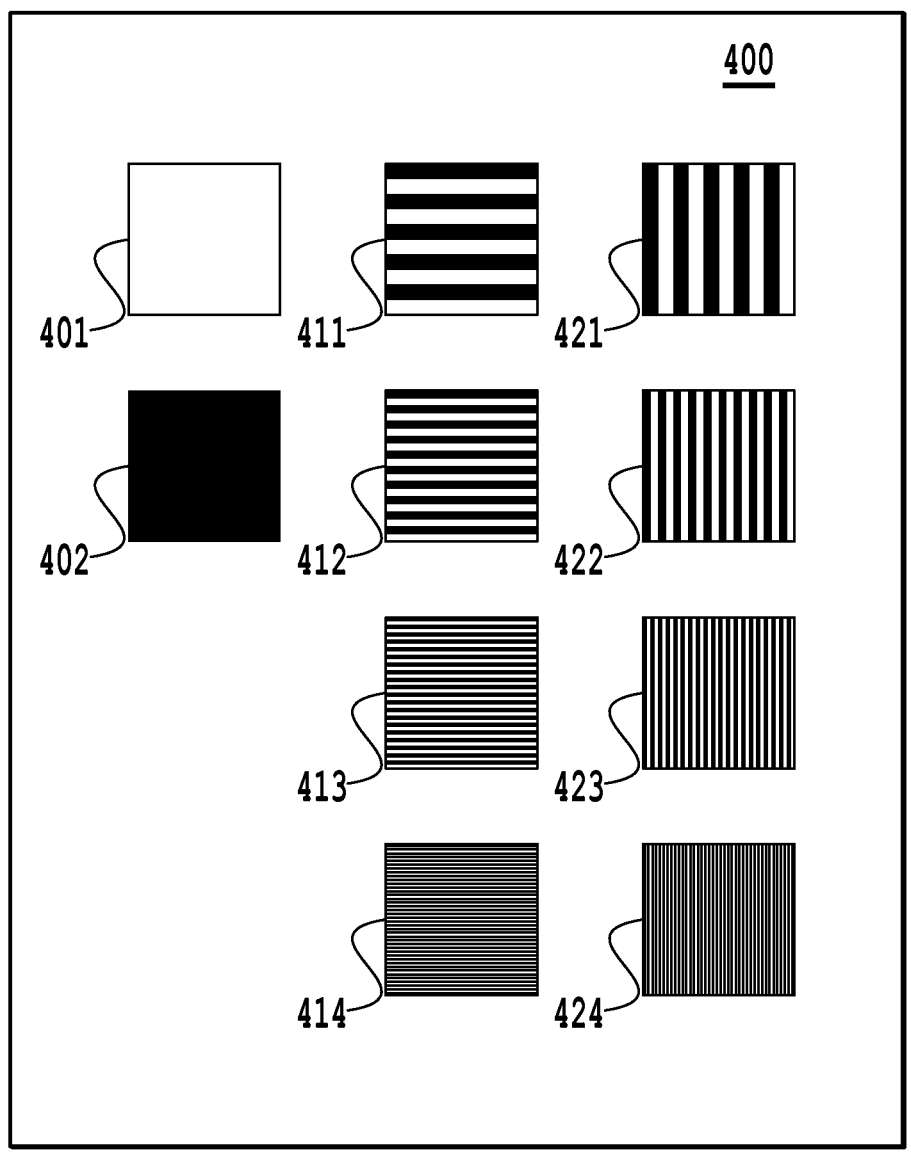
FIG. 4 shows an example of striped patch images in accordance with the present embodiment.

FIG. 4 shows an example of a print image, used in the present embodiment, for which patch images for detection of spatial frequency response characteristics are printed. The print image 400 shown in FIG. 4 includes all-white-colored and all-black-colored patches (401 and 402) and striped patch images (411-414, 421-424) having different plural frequency characteristics. The respective patch images will be described in detail.

The all-white-colored patch 401 is a patch for detection of the base of a paper sheet for printing a patch image/images. The all-black-colored patch 402 is a patch for detection of the density of a color material for printing a striped patch image/images.

Next, striped patch images will be described. Striped patches 411, 412, 413 and 414 are striped patch images of different frequency characteristics. For reasons of expediency of description, frequency characteristics will be assumed to be 4 [lp/mm] for the patch 411, 6 [lp/mm] for patch 412, 8 [lp/mm] for patch 413, and 10 [lp/mm] for patch 414. Herein, lp/mm is abbreviation for Line Pair per MilliMeter and is a unit that indicates how many lines are resolved per 1 mm.

The striped patches 421, 422, 423 and 424 correspond to patches that are formed by rotation of the striped patches 411, 412, 413 and 414 by 90 degrees. These patches detect the spatial frequency responses in both the main scanning direction and sub-scanning direction of the image reading unit 217, wherein striped patches with rotation by 90 degrees are prepared.

These striped patches are similar to the black and white line chart, described above, for simple measurement of spatial frequency response. In the present embodiment, however, a line chart specially prepared for detection of spatial frequency response characteristic is not used, but a print image 400 output by the printer section 117 of the image processing apparatus 100 is used. With an output by the printer section 117 of the image processing apparatus 100, a chart for measurement can be created at any time for any occasion.

<Description of Calculation Method for Spatial Frequency Response Characteristic in the Present Embodiment>

Figure 5A:
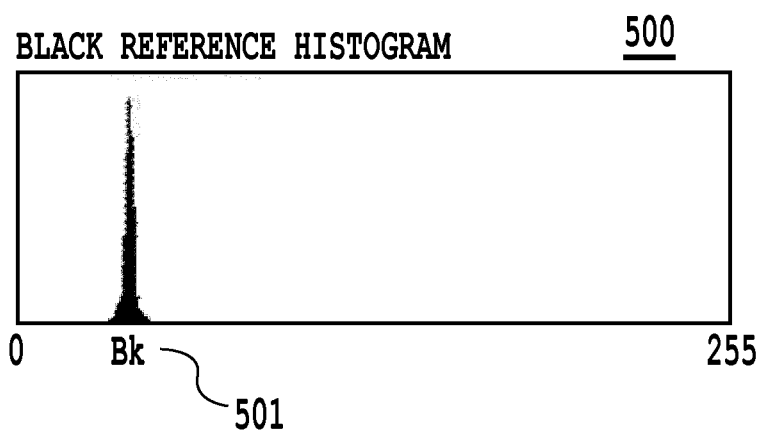
FIG. 5A shows an example of a histogram of a striped patch image in accordance with the present embodiment.
Figure 5B:
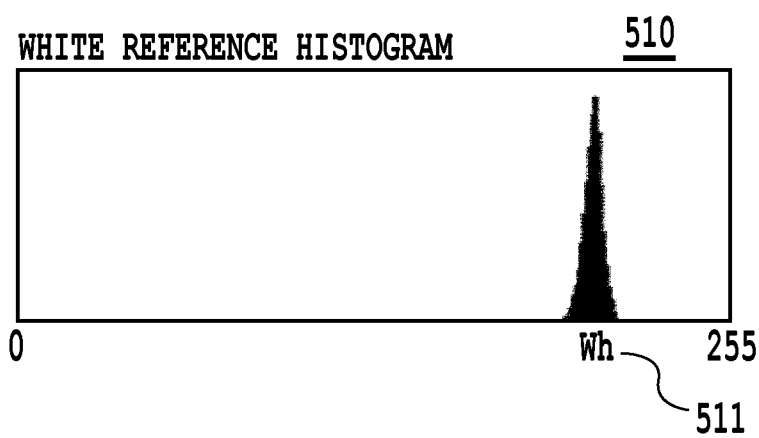
FIG. 5B shows an example of a histogram of a striped patch image in accordance with the present embodiment.
Figure 5C:
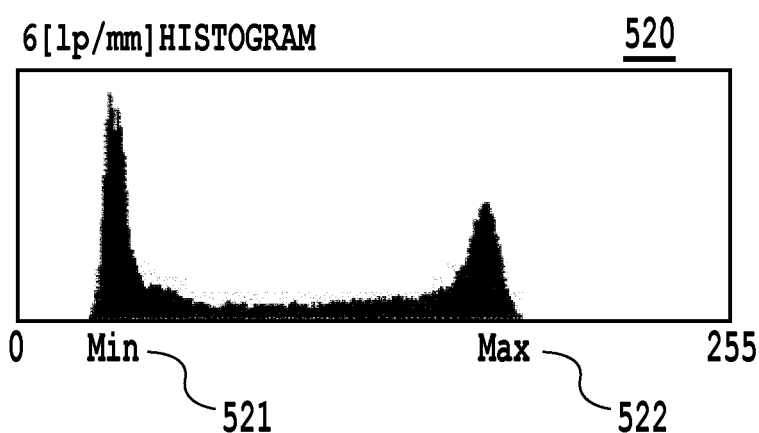
FIG. 5C shows an example of a histogram of a striped patch image in accordance with the present embodiment.

A method of obtaining the spatial frequency response characteristics from the striped patches having been described with reference to FIG. 4 will be described. Among the print image 400 with printed striped patches, the all-white-colored patch 401 is a patch to be a white reference. The all-black-colored patch 402 is a patch to be a black reference. Histograms of signal values are made with a certain image size for the respective patches. An obtained result is shown in FIGS. 5A to 5C. A histogram 500 corresponds to the all-black-colored patch 402 to be the black reference, and a histogram 510 corresponds to the all-white-colored patch 401 to be the white reference. Employing the average values, for example, as reference values, the difference (Wh−Bk) between Bk 501 for the black reference and Wh 511 for the white reference is the maximum possible signal difference. Although the average values are employed as the reference values just as an example herein, central values or most frequent values, for example, may be employed. Further, it is not necessarily required to obtain histograms, and average values of signal values in a certain size may be used.

Next, a case of obtaining the spatial frequency response characteristic of the patch 413, for example, will be described. With the striped patch 413, a histogram of signal values for a certain image size is prepared likewise. A histogram 520 is obtained. Because it is a histogram of signal values of stripes, two humps appear at a low signal value (i.e. the image is black) and a high signal value (i.e. the image is white). At the hump with the lower signal value, the signal value at the peak of the hump, for example, is assumed to be Min 521. At the hump with the higher signal value, the signal value at the peak of the hump, for example, is assumed to be Max 522. The difference (Max−Min) between Max 522 and Min 521 is the maximum possible signal difference for the stripes. Although Max and Min are set to the most frequent values to be the peaks just as an example herein, the average values, maximum values simply, minimum values, or the like of the humps may also be employed.

From the values obtained in such a manner, the following definition is made:

$$\text{spatial frequency response}(\%) = ((\text{Max}-\text{Min})/(\text{Wh}-\text{Bk})) \times 100$$

By calculating this value for striped patches of plural different spatial frequencies, the relationship between spatial frequency and contrast (ratio between brightness and darkness) is obtained. This is based on a method of obtaining the spatial frequency response according to the above-described measuring method that uses a black and white line chart in substitution.

<Description of Processing Flow for Adjusting the Spatial Frequency Response Characteristics of the Front and Back Sides to Each Other in the Present Embodiment>

Taking the example of the above-described print image 400 formed of striped patches, the processing flow of a method of adjusting the spatial frequency response characteristics of two sensors to each other will be described with reference to FIG. 6.

In step 601, upon pressing down the start button at the operation section 111 by a user, the CPU 101 starts output processing of the patches. The CPU 101 transmits the bitmap data of the print image 400 held in the high-capacity storage 106 to the printer image processing section 115 via the storage control section 105 and data bus 104. The printer image processing section 115 performs print image processing on the received bitmap data of the print image 400, and transmits the data to the printer section 117 via the printer I/F 116. The print image 400 printed on a sheet is output by the printer section 117. The print image 400 held by the high-capacity storage 106 may be held not in an image form but as a program capable of generating an image by calculation.

In step 602, corresponding to operation by the user at the operation section 111, the CPU 101 starts reading processing of the print image 400 having been mounted by the user on the original tray 201 of the automatic original feeding unit 200 with the printed surface being the top surface. The CPU 101 controls the first reading section (CCD line sensor 226) of the image reading unit 217 to read the print image 400.

In step 603, the CPU 101 inputs the print image 400 (read image) having been read by the first image reading section to the scanner image processing section 112 via the scanner I/F 113. With the scanner image processing section 112, the CPU 101 executes spatial frequency conversion processing (filter processing) on the print image 400 having been input. The processing result is held in the RAM 103 or the high-capacity storage 106 under instruction by the CPU 101.

In step 604, first, the CPU 101 reads out the print image 400 that has been subjected to spatial frequency conversion processing and is held by the RAM 103 or high-capacity storage 106. Then, among the striped patches in the print image 400, the CPU 101 determines a striped patch whose spatial frequency characteristic is to be referred to in the later-executed calculation processing of spatial frequency response characteristic. The determination of a striped patch to be referred to is made based on the amount of change in the spatial frequency response converted by the filter processing in step 603 so that a calibration amount (correction amount) can be calculated with a high accuracy in step 610. Details of the processing by step 603 and 604 will be described later, referring to FIG. 7 and the like.

Figure 7:
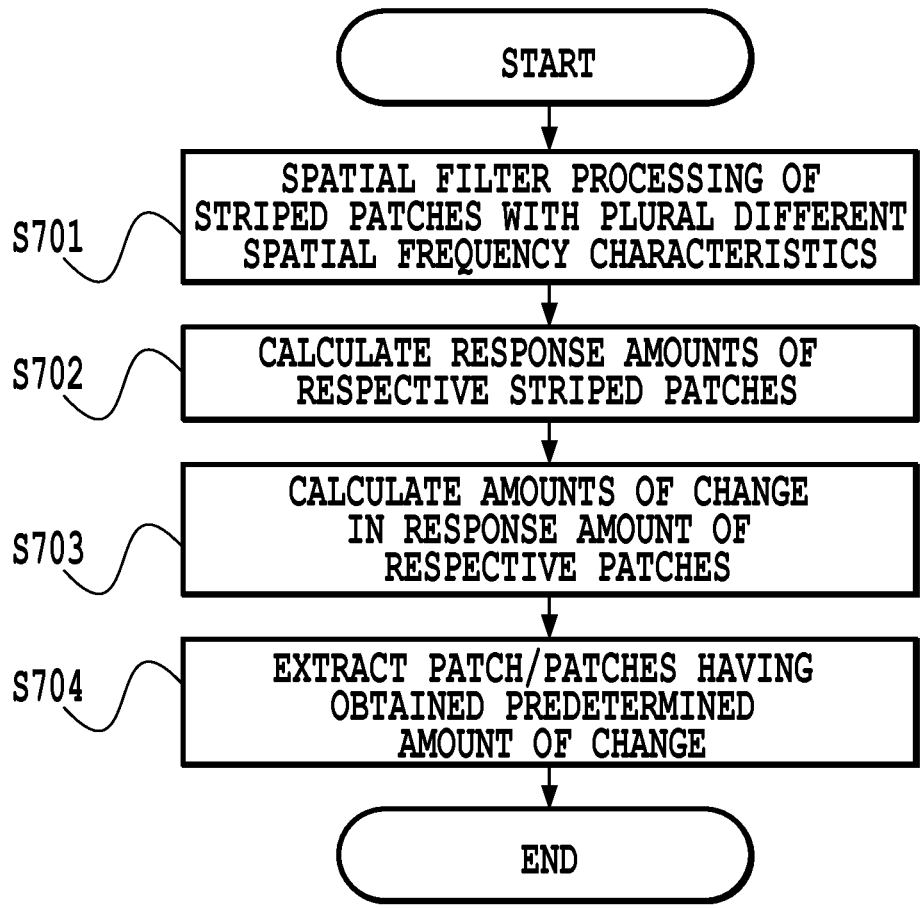
FIG. 7 is a flowchart of referential frequency patch determination processing in accordance with the present embodiment.

In step 605, the CPU 101 refers to the striped patch determined in step 604, and calculates the spatial frequency response characteristic of the first image reading section. An example of a calculation method of spatial frequency response characteristic has been described above. When spatial frequency response characteristic necessary in the processing, which will be described later and is shown in FIG. 7, has been already calculated, it is not necessary to calculate it again in step 605.

In step 606, corresponding to operation by the user at the operation section 111, the CPU 101 starts reading processing of the print image 400 (the same image having been scanned in step 602) having been mounted by the user on the original tray 201 of the automatic original feeding unit 200 with the printed surface being the bottom surface. The CPU 101 controls the second reading section (CIS 228) of the image reading unit 217 to read the print image 400.

In step 607, the CPU 101 inputs the print image 400 having been read by the second image reading section to the scanner image processing section 112 via the scanner I/F 113. With the scanner image processing section 112, the CPU 101 executes spatial frequency conversion processing (filter processing) of the print image 400 having been input. The processing result is held in the RAM 103 or the high-capacity storage 106 under control by the CPU 101.

In step 608, the CPU 101 refers to the striped patch determined in step 604, and calculates the spatial frequency response characteristic of the second image reading section. An example of a calculation method of spatial frequency response characteristic has been described above.

In step 609, the CPU 101 compares the spatial frequency response characteristic of the first image reading section obtained in step 605 and the spatial frequency response characteristic of the second image reading section obtained in step 608. Details of the comparison method will be described later, referring to FIGS. 12, 15, and others.

In step 610, based on the comparison result of step 609, the CPU 101 calculates a calibration amount/amounts so that the spatial frequency response characteristics of the read images, which have been read by the first and second reading sections and subjected to filter processing, become equal to each other. Herein, the calibration amount/amounts calibrate the amounts of change in the spatial frequency that is converted by filter processing. For example, when the spatial frequency response of the read image having been read by the second image reading section is higher by 10% than the spatial frequency response of the read image having been read by the first image reading section, the calibration amounts are determined such as to eliminate the difference (or such as to make the both spatial frequency responses be nearly equal). In the case of this example, a method may be considered that determines calibration amounts for increasing the spatial frequency conversion amount related to the first image reading section by 5% and decreasing the spatial frequency conversion amount related to the second image reading section by 5%. Other methods may also be considered, for example, a method that determines a calibration amount for increasing the spatial frequency conversion amount related to the first image reading section by 10%, or a method that determines a calibration amount for decreasing the spatial frequency conversion amount related to the second image reading section by 10%.

In step 611, the CPU 101 controls the RAM 103, the high-capacity storage 106, or a storage unit other than those, to store the calibration amount/amounts calculated in step 610. When filter processing is performed later, filter processing will be performed, based on this/these stored calibration amount/amounts, so that the spatial frequency response characteristics of the read images read by the first reading section and read by the second reading section become equal to each other.

In accordance with the above-described processing, because the patches that are output from the printer are used to analyze the spatial frequency response characteristics, it is possible to calibrate the spatial frequency response characteristics of the front and back sides without requiring a dedicated chart or device, at any time and for any occasion. Further, by arranging the patches to be output from the printer with striped patterns of plural spatial frequency response characteristics, the variation in the quality of performance of printers can be eliminated.

In such a manner, the difference in spatial frequency response characteristic between the front and back sides can be eliminated, and the differences between the two sides in sharpness, results of determination processing and the like, and color taste can be reduced.

<Description of Determination Method of Referential Patches in the Present Embodiment>

The processing flow of steps 603 and 604 in FIG. 6 will be described, referring to FIG. 7. Step 701 corresponds to step 603. In step 701, the print image 400 read by the first image reading section is subjected to spatial frequency conversion processing (filter processing) by the scanner image processing section 112 via the scanner I/F 113 and under control by the CPU 101. The spatial frequency conversion processing is performed on respective print images 400, wherein later-described spatial filters with plural different spatial frequency characteristics are used for the same print image 400 (patch images). That is, in this example, spatial frequency conversion processing is performed for the number of times of multiplication between the number of the print images 400 and the number of spatial filters.

Steps 702, 703, and 704 correspond to step 604. In step 702, the CPU 101 calculates respective frequencies of the respective striped patches after having been subjected to spatial frequency conversion processing. Herein, the response amounts in the number of the spatial filters are calculated for each striped patch.

In step 703, the CPU 101 calculates the amounts of change in the response amount of the respective striped patches from that before spatial frequency conversion processing to that after spatial frequency conversion processing for each frequency. Herein, amounts of change are calculated for the number of spatial filters.

In step 704, as a referential patch to be used in the above-described step 605, the CPU 101 extracts a striped patch of a frequency characteristic that obtained a predetermined amount of change, based on the amount of change in the response amount obtained in step 703. For example, as a referential patch, a striped patch may be extracted that obtained the same amount of change as the amount of change expected to be obtained by spatial frequency conversion processing, with respect to the spatial frequency response. Otherwise, as a referential patch, a striped patch may be extracted that has the highest frequency (the highest number of lines) among striped patches that obtained an amount of change comparable with this expected amount of change. Details of an extraction (determination) method of a referential patch will be described later, referring to FIG. 11 and the like.

The determination (extraction) method of a referential patch will be described below in detail, referring to drawings.

Figure 8:
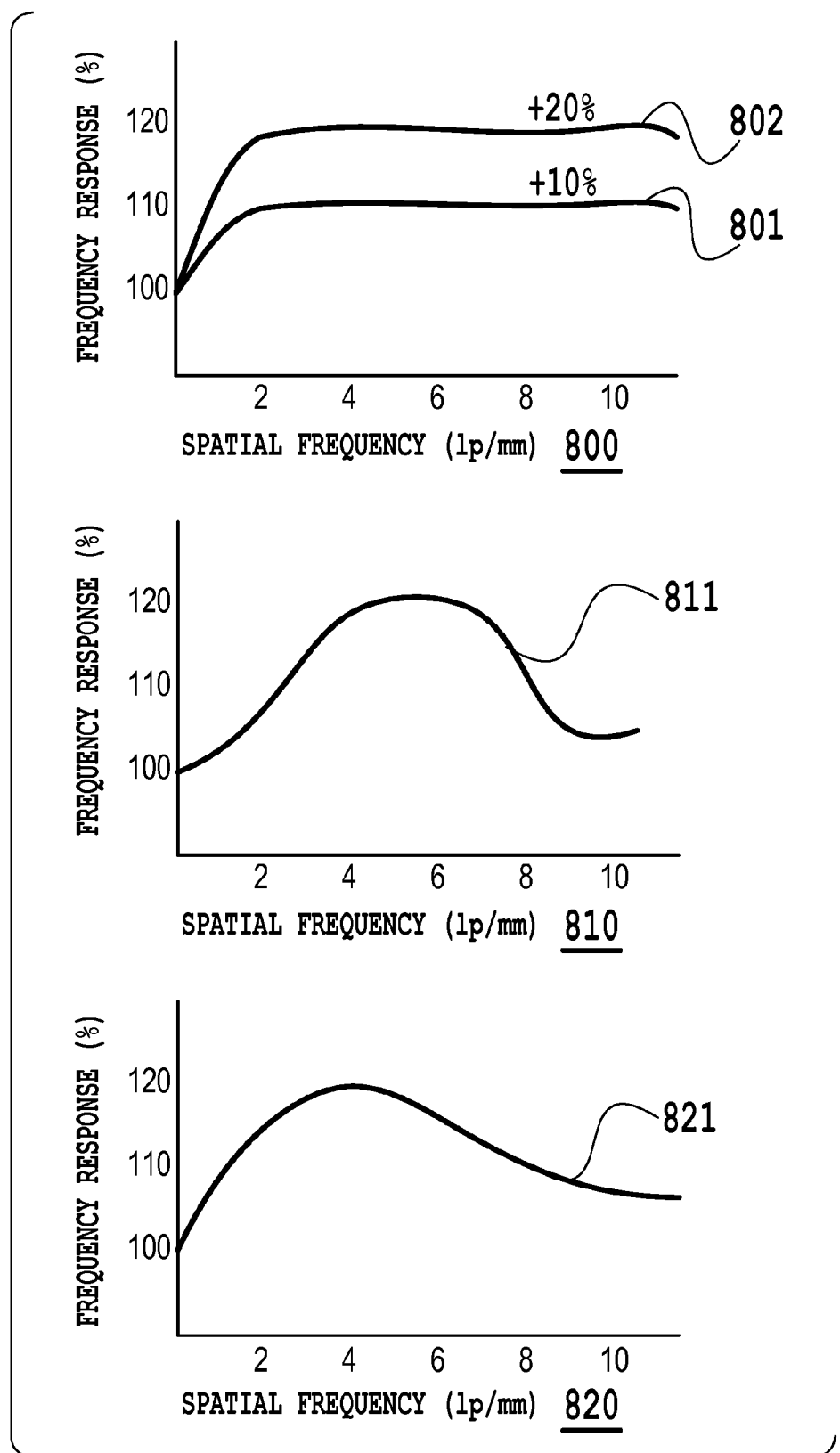
FIG. 8 shows examples of spatial frequency response characteristics of a spatial filter in accordance with the present embodiment.

FIG. 8 shows an example of frequency characteristics of spatial filters used in step 701. A spatial filter 801 is a spatial filter that obtains a frequency response with an increase of 10% in a frequency range higher than 2 [lp/mm]. A spatial filter 802 is a spatial filter that obtains a frequency response with an increase of 20% in a frequency range higher than 2 [lp/mm].

Although an ordinary spatial filter has a characteristic, as shown in a filter 811 or 821, a spatial filter having a flat characteristic in a frequency range higher than 2 [lp/mm] will be used here for brevity of description.

Next, referring to spatial filters 801 and 802 shown in FIG. 8, it will be described about a method of determining which striped patch is to be referred to among the striped patches of the print image 400 in order to compare the spatial frequency characteristics of the first image reading section 226 and the second image reading section 228.

Figure 9:
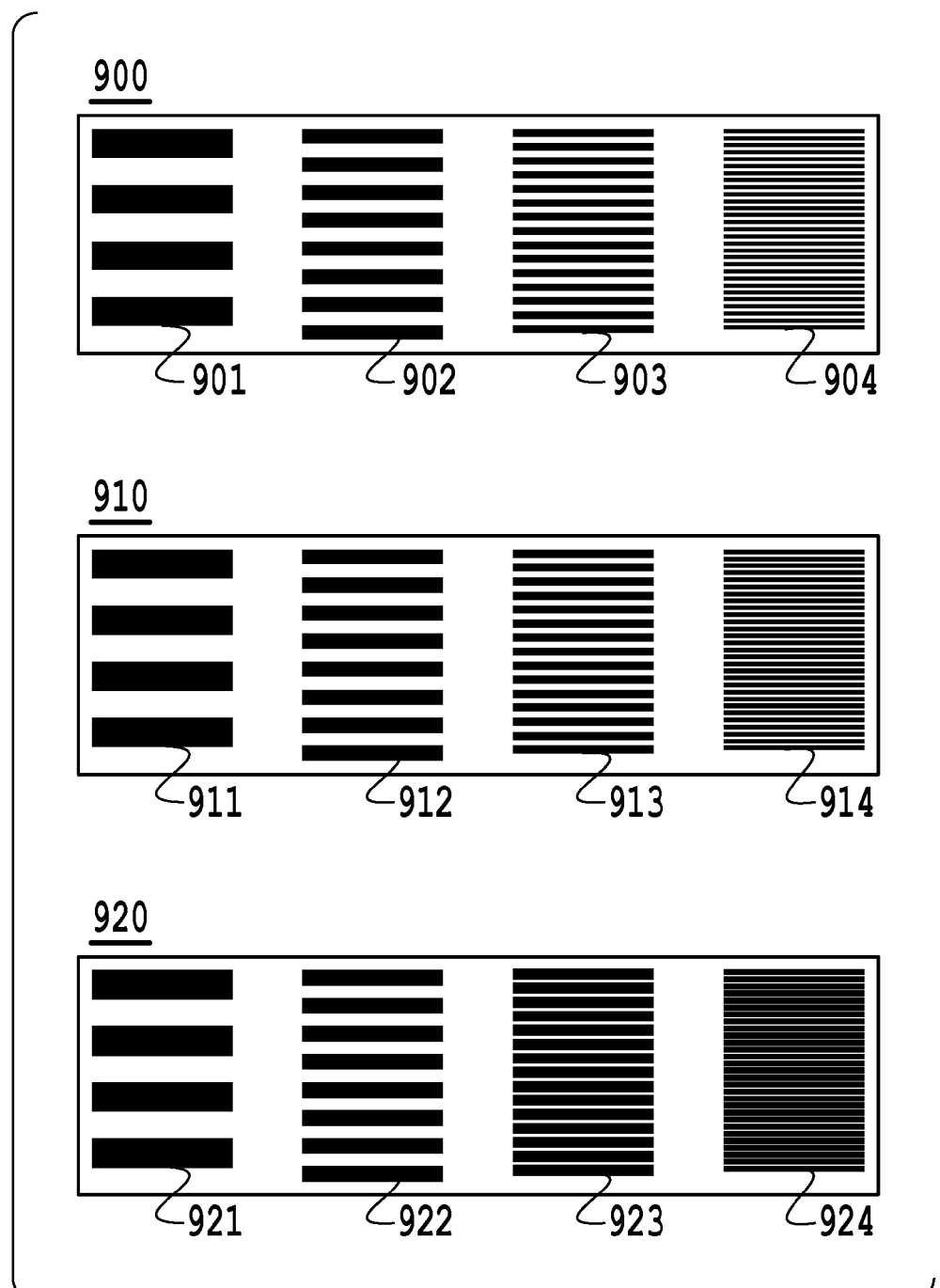
FIG. 9 shows an example of a print output of striped patches in accordance with the present embodiment.

The striped patch 900 in FIG. 9 have respective different spatial frequency characteristics. For the sake of convenience, it will be assumed that the frequency characteristics are 4 [lp/mm] for the patch 901, 6 [lp/mm] for the patch 902, 8 [lp/mm] for the patch 903, and 10 [lp/mm] for the patch 904.

Figure 10:
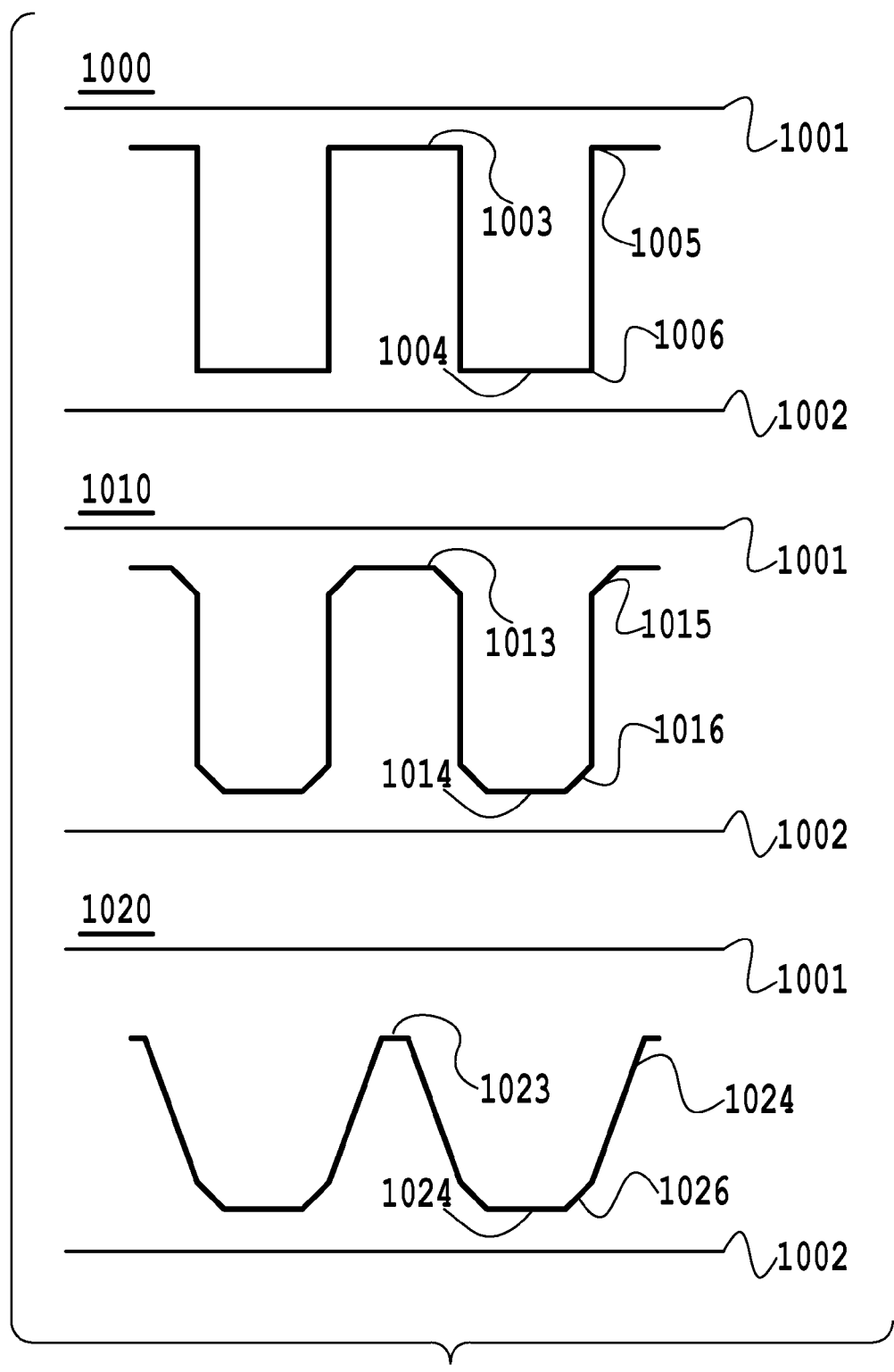
FIG. 10 shows an example of signal profiles of a print output of striped patches in accordance with the present embodiment.

When the striped patches 900 are printed out by the printer section 117 and read by the first image reading section 226 for example, an ideal cross-sectional view of a striped patch portion will be like a cross-section 1000 shown in FIG. 10. For example, when an image signal having been read is a brightness signal of 8 bits, representing level 0 by 1002 and level 255 by 1001, the white portions will be read as 1003 and the black portions as 1004 as a result of correct reading of the white and black of the striped patches. Herein, these values are equal to the values of the white reference and black reference described above referring to FIG. 4. The signal value of the white portion 1003 is not necessary to be level 255. Considering subsequent processing, it is desired to be lower than level 255. Further, the signal value of the black portion 1004 is not necessary to be level 0. Considering subsequent processing, it is desired to be higher than 0 level. Although, in reality, it is not always possible to read ideally depending on the frequency of a striped patch and the resolution of a reading section, this problem will be avoided by reading plural striped patches so as to read in a resolution with consideration of this fact.

If the printer section has a low quality of performance, a print out by the printer section 117 will be like a striped patch 910 or 920. The print out will be affected little by the low quality of performance when the spatial frequency is low, and affected a lot when the spatial frequency is high resulting in that the width of the striped patch itself and the interval between the stripes are different from an ideal form. It will be described concretely, taking an example of the patch 904 with a frequency characteristic of 10 [lp/mm].

The striped patch 904 is a result of printing out in an ideal state. The cross-section 1000 in FIG. 10 is a cross-sectional view of the signal value thereof. The white portion 1003 and black portion 1004 have the same width and the signal values thereof are the same as those of the black and white references.

The striped patch 914 shows a result of printing out by a printer with a comparatively high quality of performance. The cross-section 1010 in FIG. 10 is a cross-sectional view of the signal value thereof. At a switching portion between a white portion 1013 and black portion 1014 (for example, 1015 or 1016), although a steep portion of variation in the signal value disappears, the width of the white portion 1013 and the width of the black portion 1014 are substantially equal to each other, and the signal values thereof are also equal to those of the white and black references.

The striped patch 924 is a result of printing out by a printer with a low quality of performance. The cross-section 1020 in FIG. 10 is a cross-sectional view of the signal value thereof. At a switching portion between a white portion 1023 and black portion 1024 (for example, 1025 or 1026), a steep portion of variation in the signal value completely disappears. In this example, the white portion 1023 becomes thin, while the black portion 1024 becomes thick. As a result, the black portion 1029 erodes the white portion 1023, and the signal value of the white portion 1023 becomes lower than the value of the white reference. Although, in this example, a case has been described where the black portion erodes the white portion and the striped patch is ruined, a case is also possible where the lines become thin and the black portion erodes the white portion. In this case, the signal value of the black portion becomes higher than that of the black reference. In either case, the signal values of the white portion 1023 and black portion 1024 are affected by the printing performance quality of the printer, resulting in a so-called drop in contrast.

Although description has been made herein taking an example of the patch 904 with a frequency characteristic of 10 [lp/mm], the same phenomenon may occur for a striped patch with a frequency characteristic other than this. However, the degree of effects is dependent on the frequency characteristic of a striped patch. It is characterized in that: the higher the frequency of a patch, the more the effects; and the lower the frequency of a patch, the less the effects.

Using a striped patch with such a characteristic, the determination method for a referential patch performed in step 604 will be described.

The striped patches 910 in FIG. 9 are a result of printing out by a printer with a high quality of performance. Herein, the patches 911, 912, 913, and 914 have respective different spatial frequency response characteristics. For the sake of convenience, it will be assumed that the frequency characteristics are 4 [lp/mm] for the patch 911, 6 [lp/mm] for the patch 912, 8 [lp/mm] for the patch 913, and 10 [lp/mm] for the patch 914.

The processing shown in step 701 is performed on four patches with different spatial frequency characteristics. Concretely, using the spatial filters 801 and 802, spatial frequency conversion processing is performed on the respective striped patches.

Next, as shown in step 702, spatial frequency response is calculated for each of the striped patches before and after spatial frequency conversion.

Then, as shown in step 703, the amounts of change in the spatial frequency response from that before spatial frequency conversion processing to that after spatial frequency conversion processing are calculated. Results are shown in table 1100 in FIG. 11.

Finally, extraction of a specific patch shown in step 704 will be described. "After Processing (+10%)" are results of applying the spatial filter 801. "After Processing (+20%)" are results of applying the spatial filter 802. The spatial filter 801 obtains a response of +10% in the respective frequency ranges. The spatial filter 802 obtains a response of +20% in the respective frequency ranges. As shown in table 1100 in FIG. 11, with striped patches printed out by a printer with a high quality of performance, an expected response amount is obtained for each of the striped patches. Based on this result, striped patches with a response amount higher than or equal to a predetermined amount are determined to be referable patches.

Next, examples of striped patches printed out by a printer with a low quality of performance will be described. The striped patches 920 in FIG. 9 are printed out by a printer with low performance quality. Herein, the striped patches 921, 922, 923, and 924 have spatial frequency response characteristics corresponding to the striped patches 910. It will be assumed that the frequency characteristics are 4 [lp/mm] for the patch 921, 6 [lp/mm] for the patch 922, 8 [lp/mm] for the patch 923, and 10 [lp/mm] for the patch 924. The same processing as that described above is performed, and the amounts of change in the spatial frequency response from that before spatial frequency conversion processing to that after spatial frequency conversion processing are calculated. A result is shown in table 1110 in FIG. 11.

When a printer having a low quality of performance is used, a difference is caused in the amount of change in the spatial frequency response from that before spatial frequency conversion processing to that after spatial frequency conversion processing, depending on the spatial frequency of a striped patch. For example, no difference is caused between the patch 921 of 4 [lp/mm] and patch 922 of 6 [lp/mm], however, the amount of change is a little smaller than an expected amount of change with the patch 923 of 8 [lp/mm], and only a half of the expected amount of change in the response amount can be obtained with the patch 924 of 10 [l/mm]. Thus, when the spatial frequency characteristics of referential striped patches are different, if a response amount is significantly inferior to an expected value, it can be said that printing is not done with a referential accuracy with the striped patch of the corresponding spatial frequency.

Patches having four different spatial frequency responses are used to calculate four response amounts in the present embodiment. The spatial frequency response characteristics of striped pitches to be referred to can be determined according to the purpose. For example, if reference to a low frequency is sufficient, a striped patch of the highest frequency (for example, the striped patch of "6 lp/mm" in table 1110) among striped patches with a high accuracy (the calculated response amount of which is comparable with the expected value) can be determined to be a referential patch. In contrast, when it is desired to refer to a high frequency, a striped patch of the highest frequency (for example, the striped patch of "8 lp/mm" in table 1110) among striped patches having frequency characteristics with an accuracy in a predetermined range (80%, for example) can be determined to be a referential patch. Herein, by referring to not a single striped patch but a plurality of striped patches with different frequencies, the accuracy is improved. Basically, the closer to an expected value the response amount, the higher the accuracy. Accordingly, it is desired to refer to a patch whose response value is near the expected value. As the accuracy reflects variation in the quality of performance of a printer, if the printer is stable and in a satisfactory state, the response amounts of most of striped patches reach an expected value. If the printer is unstable and in a bad state, the response amounts of most of striped patches do not reach the expected value. By arranging patches with plural frequency responses in the print image 400, response amounts can be obtained, avoiding effects of variation in the quality of performance of the printer. If the printer is in a satisfactory state, all of patches with a predetermined response amount may be referred to, or only a specific frequency may be referred to.

In the present embodiment, the spatial filters 801 and 802 are used for spatial frequency conversion, however, the invention is not limited thereto. Further, the same spatial filter is applied to all the striped patches in the present embodiment, it is not always necessary to apply the same spatial filter. For example, the spatial filter 821 may be applied to the patch 902 of 6 [lp/mm], and the spatial filter 811 may be applied to the patch 901 of 9 [lp/mm]. By changing the spatial frequency characteristic of a spatial filter, corresponding to the spatial frequency characteristic of a striped patch, an optimum spatial filter can be applied, which has an effect of calculating the response amount more accurately.

<Description of Comparison Method of Spatial Frequency Response of the Front and Back Sides of a Sheet in the Present Embodiment>

Figure 12:
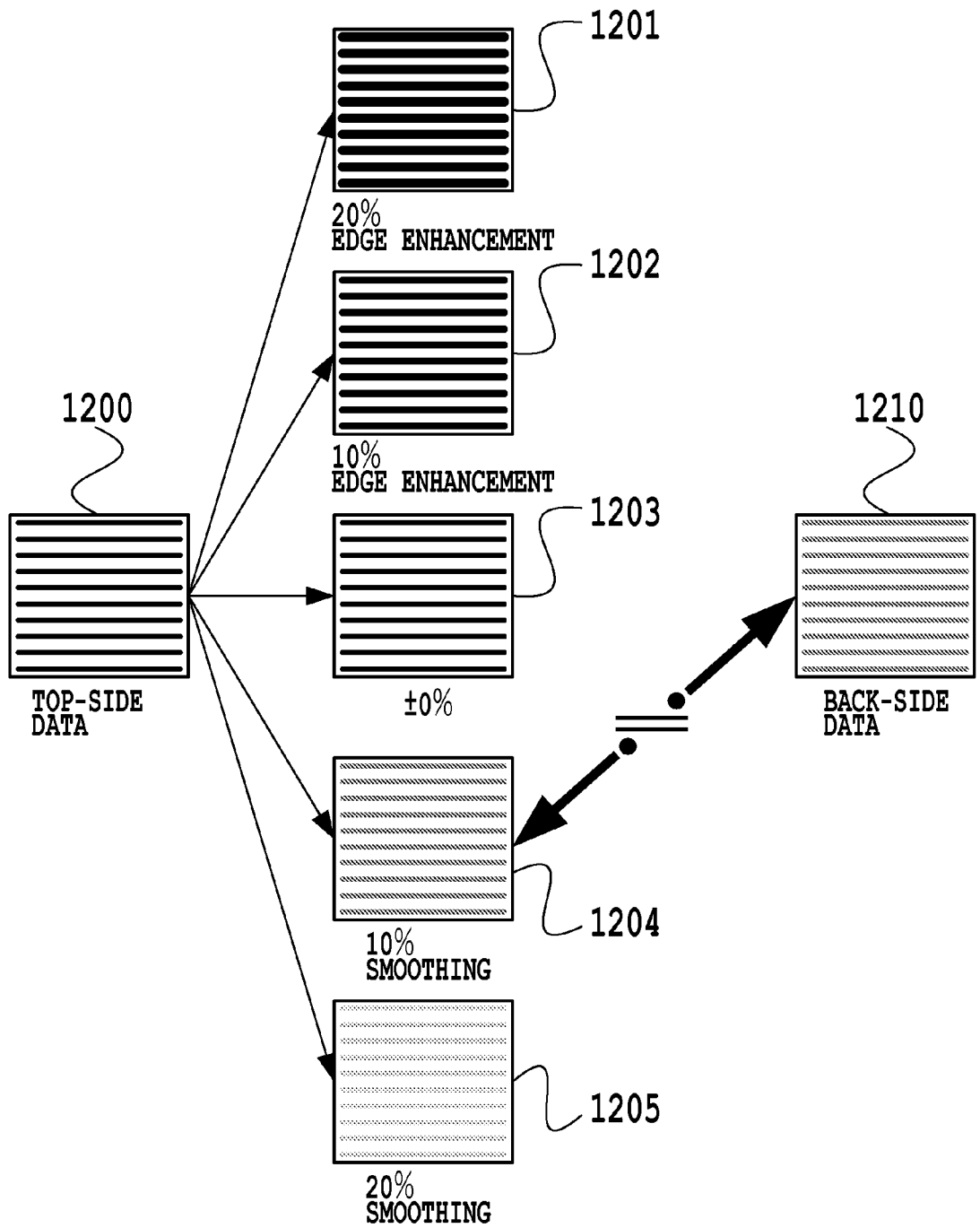
FIG. 12 shows an example of spatial frequency responses of the front and back sides and a method of comparison in accordance with the present embodiment.

In the foregoing method, when a patch to be referred to has been determined, the spatial frequency response of the top side (that is read by the first image reading section 226) is subsequently calculated on the referential patch. Using plural spatial filters having different frequency response characteristics, the striped patch is subjected to spatial frequency conversion. FIG. 12 shows an example. Herein, a striped patch 1200 being image data on the top side is subjected to edge enhancement processing and smoothing processing in two steps for each. A striped patch 1201 is a product by edge enhancement by 20%, and a striped patch 1202 is a product by edge enhancement by 10%. In contrast, a striped patch 1204 is a product by smoothing by 10%, and a striped patch 1205 is a product by smoothing by 20%. A striped patch 1203 subjected to nothing (not subjected to conversion of spatial frequency response) is used for comparison, and image data of spatial frequency response characteristics in five steps are generated from the image data of a single striped patch. Then, spatial frequency responses are calculated from the image data of the respective striped patches. With respect to the top side, if spatial frequency conversion processing (processing in FIG. 7) has been already performed by spatial filters having similar spatial frequency response characteristics for determination of the referential patch, the result thereof may be referred to as it is. In the case of the example shown in FIG.

12, spatial frequency conversion processing is performed at an interval of 10%, however, the invention is not limited thereto, and spatial frequency conversion processing may be performed at another interval, such as 5% or 1%.

With respect to the back side (that is read by the second reading section 228), the striped patch having the frequency characteristic for determination of the referential patch is selected, and the spatial frequency response is calculated from image data 1210 read by the second reading section 228. The spatial frequency response of the image data 1210 has not been converted by filter processing.

FIG. 12 is for illustration, and actually, not comparison between image data but comparison between spatial frequency responses calculated from respective image data is performed. As shown in FIG. 12, the spatial frequency responses of the top side in five steps are compared with the spatial frequency response of the back side. An example of a method therefor will be described below.

First, sequentially from the striped patches 1201 to 1205 of the top-side data, the spatial frequency responses thereof are compared with that of the back-side data 1210 to judge whether they are similar. In this example, the striped patch 1204 shows a similarity (or the closest) in spatial frequency response to the striped patch 1210. The striped patch 1204 has been obtained by performing smoothing processing by 10% on the top-side data 1200. Accordingly, the spatial frequency response of the back-side data results to be 10% lower than that of the top-side (That is, the difference in spatial frequency response between the top-side data after filter processing and the back-side data is 10%).

Figure 13:
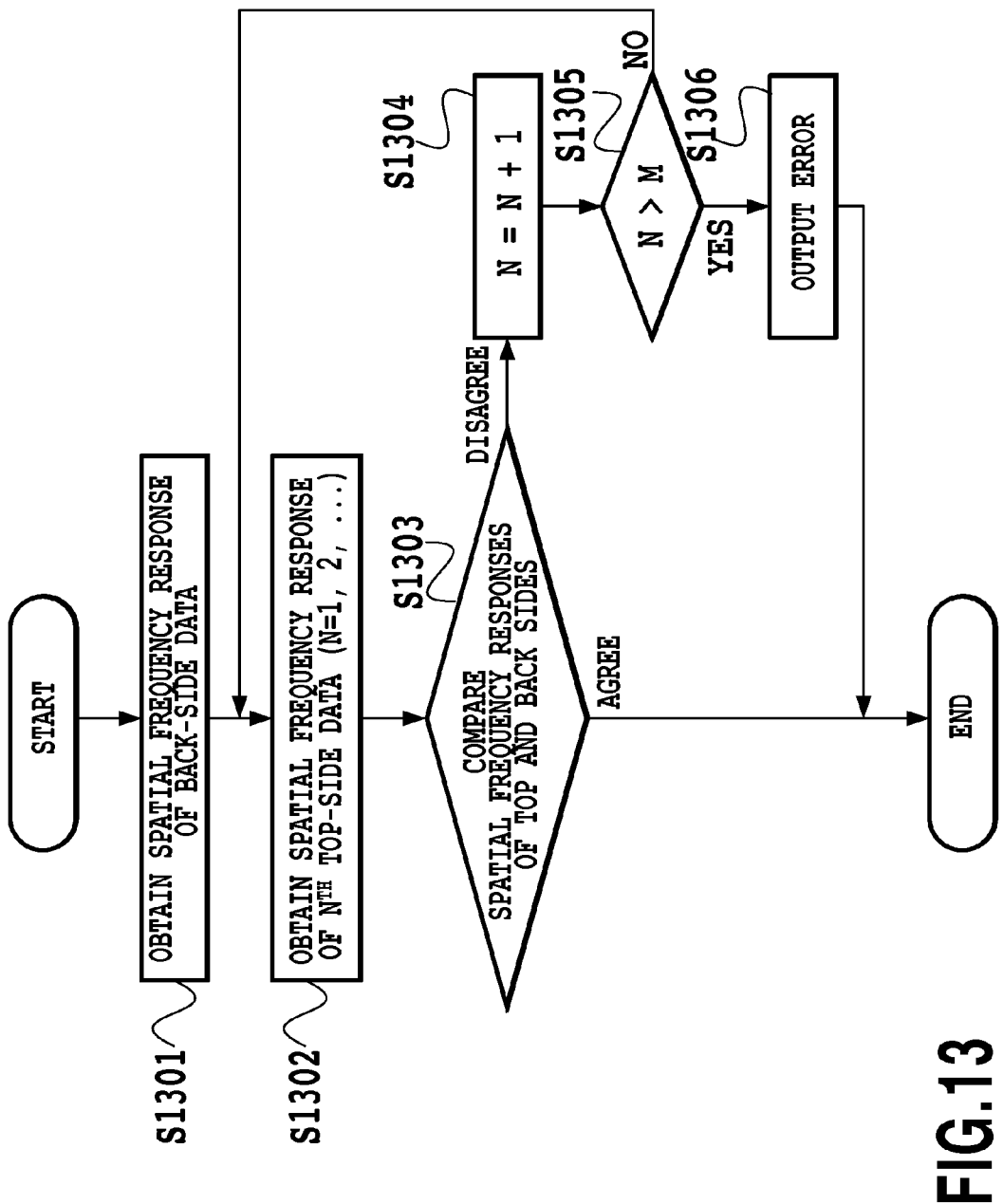
FIG. 13 is a flowchart of comparison of the spatial frequency responses of the front and back sides in accordance with the present embodiment.

The processing flow of the foregoing example will be shown in FIG. 13. In step 1301, the CPU 101 obtains the spatial frequency response of the back-side data. In step 1302, the CPU 101 obtains the spatial frequency response of the top-side data. Herein, because spatial frequency conversion is performed plural times on the top-side data, spatial frequency responses for M times of spatial frequency conversion are sequentially obtained. First, the CPU 101 obtains the spatial frequency response of the first data.

In step 1303, the CPU 101 compares the spatial frequency response obtained in step 1301 and that obtained in step 1302. If the spatial frequency responses agree with each other as a result of comparison, then the process ends, and if they disagree with each other, then the process proceeds to step 1304 and the trial count N is incremented by one.

In step 1305, the CPU 101 compares whether the trial count N is greater than the number of times M of spatial frequency conversion described above. If the trial count is smaller than or equal to M, then the process returns to step 1302, and if the trial count is greater than M, then the process proceeds to step 1306 and the CPU 101 outputs an error because an appropriate result could not be obtained.

In such a manner, the top-side data having been subjected to spatial frequency conversion and the back-side data are compared, and similar spatial frequency response amounts are obtained. When the process ends normally, the CPU 101 calculates, based on the response amounts, the difference in the spatial frequency response amount between the top-side data and the back-side data, and determines a calibration amount such as to make the spatial frequency response characteristics of the both data equal to each other. When a spatial frequency response cannot be obtained, the CPU 101 outputs an error and terminates the process, wherein no calibration amount is calculated.

Although, in the present embodiment, an example where judgment is made depending on agreement or disagreement, it is not necessary to make judgment depending on perfect agreement or disagreement. For example, instead of agreement, closeness may be considered to be agreement. Otherwise, when closeness has been found, one more trial may be made, and a nearer one of two results may be selected. Further, a value obtained from the weighted average of the two results may be considered to be a result.

<Description of a Modified Example of a Spatial Frequency Conversion Method in the Present Embodiment>

Figure 6:
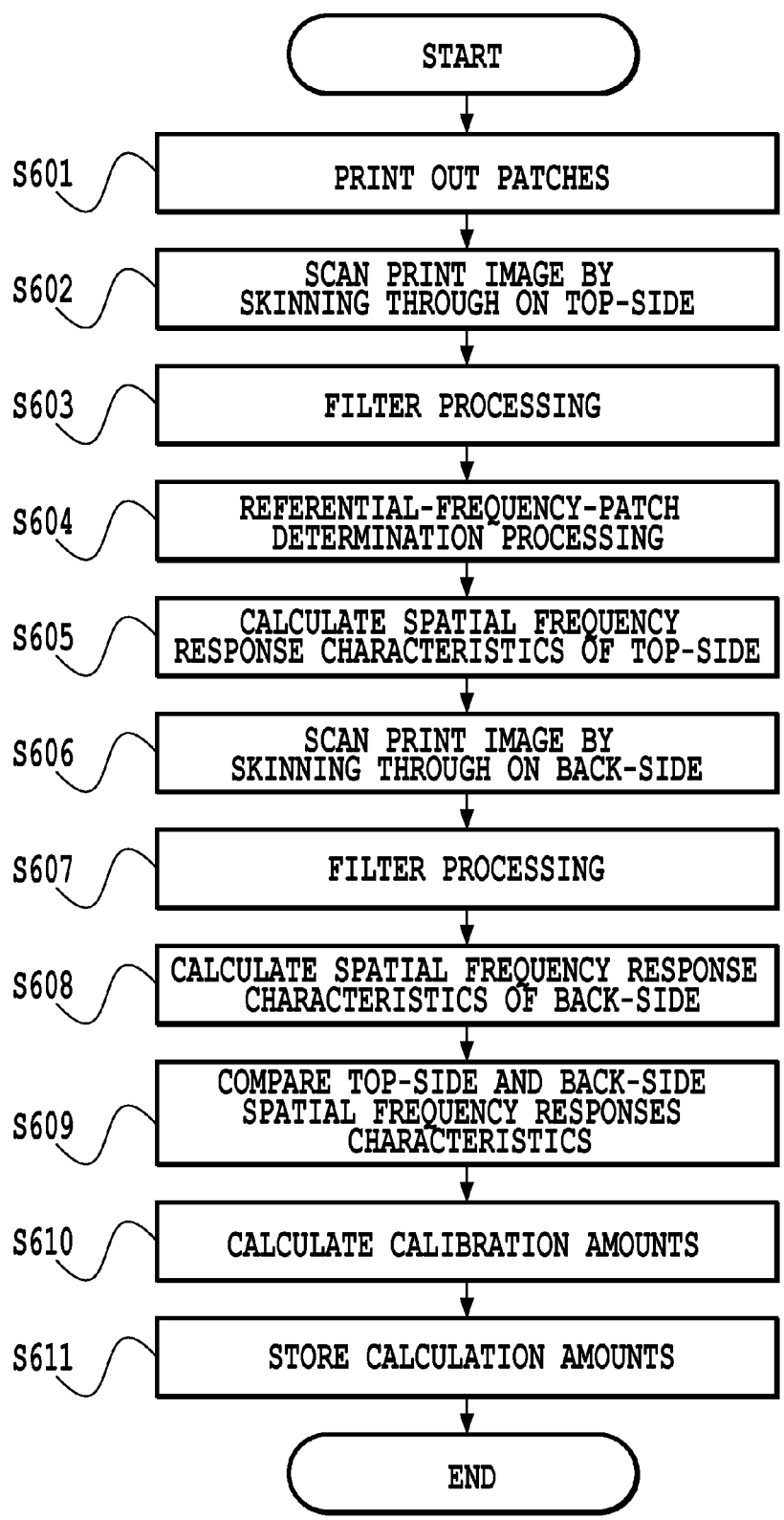
FIG. 6 is a flowchart of calculation of the spatial frequency responses of the front and back sides of an original in accordance with the present embodiment.

The calibration amount calculation processing shown in FIG. 6 is a processing performed by the scanner image processing section 112 under control by the CPU 101 shown in FIG. 1. As a modified example, a method will be described below that performs calibration amount calculation processing and spatial frequency calibration processing by the scanner section 114.

Figure 14:
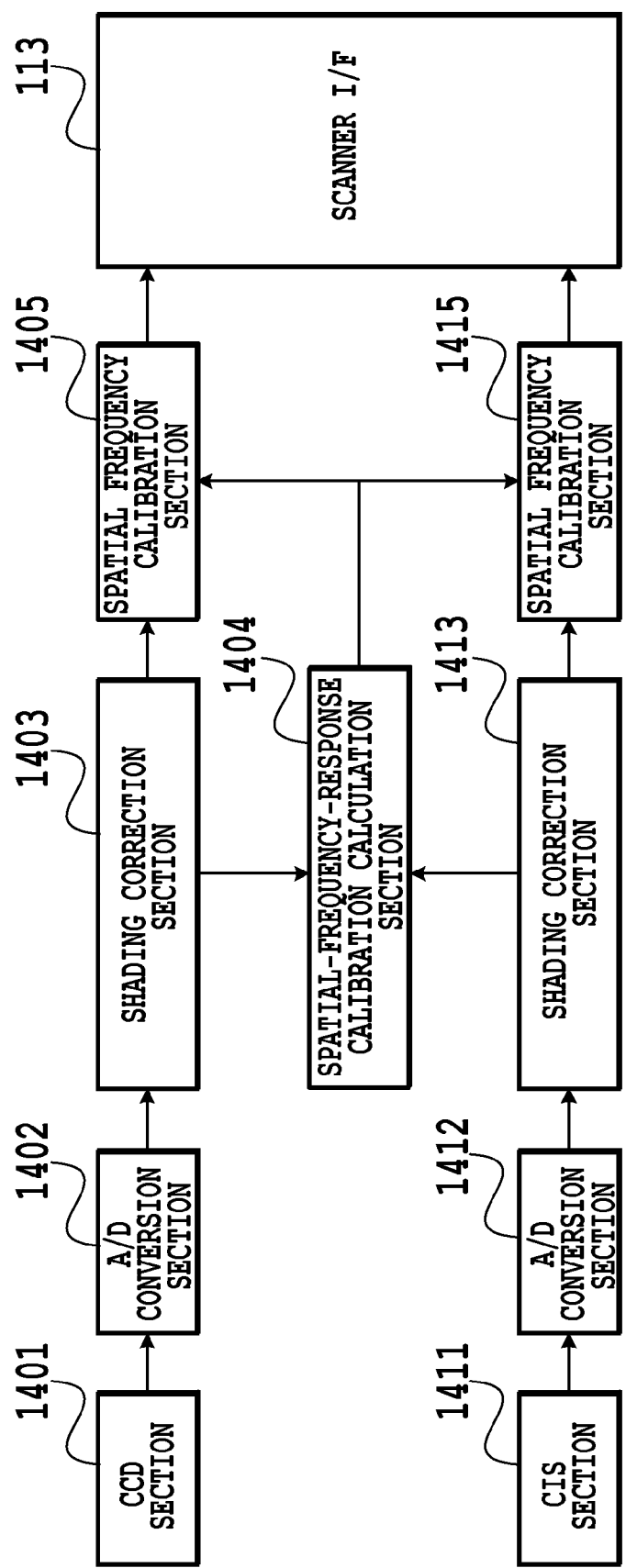
FIG. 14 shows an example of a method of calibration of the spatial frequency responses of the front and back sides in accordance with the present embodiment.

FIG. 14 is a diagram showing the image processing performed by the scanner section 114 (the image reading unit 217 in FIG. 2) by function blocks along the flow thereof. The image reading unit 217, omitted in the figure, is provided with an information processing unit having a CPU, ROM, RAM, and input-output unit, wherein the information processing unit executes a control program to perform the above-described image processing.

After the processing in step 601 shown in FIG. 6, a CCD section 1401 and CIS section 1411, both being a reading unit, output image data having been read respectively by the CCD line sensor 226 and CIS 228 as respective analog signals. These analog signals are respectively converted into digital signals by A/D conversion sections 1402 and 1412. The image data having been converted into the digital signals are respectively subjected to shading correction by shading correction sections 1403 and 1413.

With the shading correction sections 1403 and 1413, in order to correct variation in image data among pixels caused through reading by image-pickup sensors including the CCD line sensor 226 and CIS 228, a gain adjustment value and offset adjustment value are set for each pixel.

First, a shading white plate is fed by the automatic original feeding unit 200; a lamp 219 is lighted on to irradiate the shading white plate positioned on the flow reading glass 216; and the shading white plate is read by the CCD line sensor 226. Thus, shading data on the side of the first image reading section is obtained. Next, the shading white plate is moved onto the flow reading glass 229, and is irradiated by a light source built in the CIS 228 so as to be read by the CIS 228. Thus, shading data on the side of the second reading section is obtained. The gain value is adjusted for each pixel so that each pixel value of the both shading data of the CCD line sensor 226 and CIS 228 obtained in such a manner becomes a predetermined target value (for example, a brightness value 245). Thus obtained gain adjustment values are respectively stored as shading correction data.

Subsequently, in a state that the respective lamps of the CCD line sensor 226 and CIS 228 are off, data that are output from the CCD line sensor 226 and CIS 228 are obtained. Then, offset adjustment is performed for the respective pixels so that the respective pixel values (black offset values) become a predetermined target value (for example, brightness value 5). Thus obtained offset adjustment values are respectively stored as shading correction data.

Using such stored shading correction data, shading correction sections 1403 and 1413 respectively perform shading correction on normal image data obtained from the CCD line sensor 226 and CIS 228.

Based on the both image data having been subjected to the shading calibration, a spatial-frequency-response calibration calculation section 1404 calculates the filter factors of spatial frequency calibration filters to be used for calibration of spatial frequency responses. That is, the spatial-frequency-response calibration calculation section 1404 calculates the calibration amounts by a processing similar to the processing shown in S603 to S610 and the like in FIG. 6, and stores filter factors corresponding to these calibration amounts in a storage medium, such as a RAM or the like. Using the filter factors calculated by the spatial-frequency-response calculation section 1404, spatial frequency calibration section 1405 (the first spatial frequency conversion unit) and 1415 (the second spatial frequency conversion unit) respectively perform calibration of spatial frequency responses on the image data after the shading correction. That is, the filter factors are switched according to the calculated calibration amounts, and thus calibration of the spatial frequency responses is performed. By this calibration, the difference in spatial frequency response characteristic between the front and back sides of an original can be reduced. Such calibrated image data are respectively transmitted via the scanner I/F 113 to the scanner image processing section 112.

The foregoing description has been made, taking an example of calibrating the spatial frequency responses of the front and backsides in the image reading unit 217 (the scanner section 114), however, without being limited thereto, calibration may be performed in another section. For example, in the scanner image processing section 112, the filter factor of a spatial filter applied to image data may be switched depending on the top side or the back side.

As has been described above, as patches output from a printer are used to calculate spatial frequency response characteristics, spatial frequency response characteristics can be calculated at anytime and for any occasion. For example, such calculation can be performed when the present image processing apparatus has been installed at a user's site, or when the environment has been changed at the user's site. As patches output from a printer are used, the timing of performing this calculation is not limited. Further, although there may be a concern about the stability or the like of the printer, the effect of the variation in the quality of performance of the printer can be eliminated by printing patches of plural spatial frequency response characteristics, selecting reliable patches from those printed out from the printer, and calculating the spatial frequency responses.

In such a manner, the spatial frequency response characteristics of the front and back sides can be easily detected. As a result, the filter factors of spatial frequency calibration filters can be switched corresponding to the detected values, and the difference in the spatial frequency response between the front and back sides can be eliminated. Thus, the difference in sharpness, results of judgment processing, color taste, and the like between the front and back sides can be reduced.

Second Embodiment

In the first embodiment, a method has been described that obtains the spatial frequency responses of the front and back sides respectively from a striped patch having been output from the printer, and calibrates the filter factor so that the spatial frequency responses of the top side and back sides become equal to each other. During this process, with respect to the top side, one striped patch was selected from plural striped patches having different frequency responses; the selected patch was subjected to spatial frequency conversion with plural spatial filters having different frequency response characteristics; and the plural results of the top-side and the response amount of the striped patch on the back side were compared. In the present embodiment, in order to further improve the accuracy of comparison, a method that compares plural response amounts with plural response amounts will be described, referring to FIGS. 15 and 16.

<Description of Method of Comparison between Spatial Frequency Responses of Front and Back Sides in the Present Embodiment>

Figure 15:
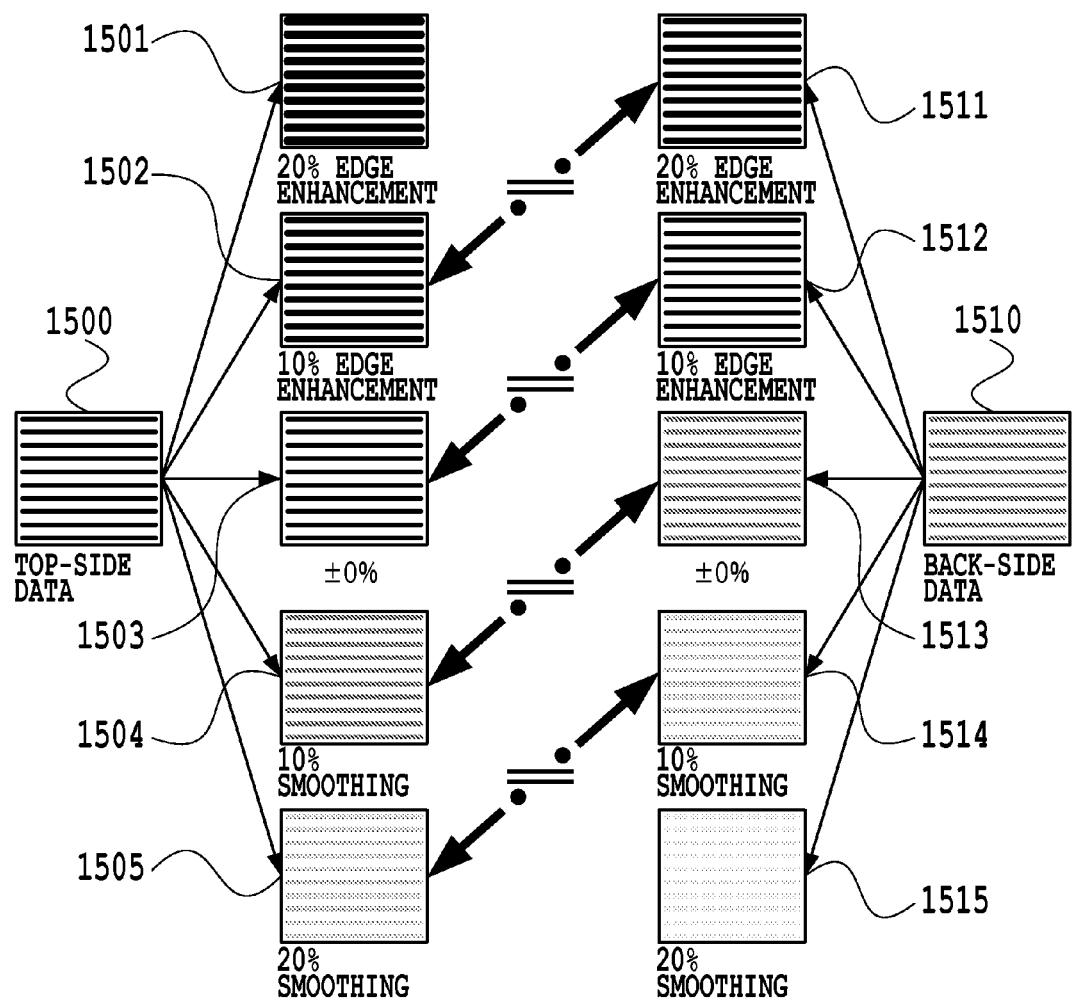
FIG. 15 shows an example of spatial frequency responses of the front and back sides and a method of comparison in accordance with the present embodiment.

By the method described in the first embodiment, a patch to be referred to is determined, thereafter, with respect to the referential patch, the spatial frequency responses of the top-side image data (image data of the referential patch read by the first image reading section 226) are calculated. Using plural spatial filters having different spatial frequency response characteristics, the image data of the top side is subjected to spatial frequency conversion by the spatial frequency calibration section 1405 (the first spatial frequency conversion unit). An example is shown in FIG. 15. Herein, a striped patch 1500 being image data of the top side is subjected to edge enhancement and smoothing in two steps for each. A striped patch 1501 is a result of edge enhancement by 20%, and a striped patch 1502 is a result of edge enhancement by 10%. In contrast, a striped patch 1504 is a result of smoothing by 10%, and a striped patch 1505 is a result of smoothing by 20%. A striped patch 1503 subjected to nothing is used for comparison, and image data of spatial frequency response characteristics in five steps are generated from the image data of a single striped patch. Then, spatial frequency responses are calculated from the image data of the respective striped patches. With respect to the top side, if spatial frequency conversion processing has been already performed by spatial filters having similar spatial frequency response characteristics for determination of the referential patch, the result thereof may be referred to as it is.

With respect to the above-described determined referential patch, the spatial frequency responses of the back-side image data (image data of the referential patch read by the second image reading section 228) are calculated. Using plural spatial filters having different spatial frequency response characteristics, the image data of the back side is subjected to spatial frequency conversion by the spatial frequency calibration section 1415 (the second spatial frequency conversion unit). Herein, a striped patch 1510 being image data of the back side is subjected to edge enhancement and smoothing in two steps for each. A striped patch 1511 is a result of edge enhancement by 20%, and a striped patch 1512 is a result of edge enhancement by 10%. In contrast, a striped patch 1514 is a result of smoothing by 10%, and a striped patch 1515 is a result of smoothing by 20%. A striped patch 1513 subjected to nothing is used for comparison, and image data of spatial frequency response characteristics in five steps are generated from the image data of a single striped patch. Then, spatial frequency responses are calculated from the image data of the respective striped patches.

FIG. 15 is for illustration, and actually, not comparison between image data but comparison between spatial frequency responses calculated from respective image data is performed.

Next, the spatial frequency responses on the top side in five steps and the spatial frequency responses on the back side in five steps are compared. An example of such a method will be described below.

First, as data on the top side, a striped patch 1501 is selected. Then, as data on the back side, five striped patches from 1511 to 1515 are selected, and the spatial frequency responses of the striped patch 1501 on the top side are sequentially compared with the spatial frequency responses of the five striped patches on the back side to judge whether they are similar. In this example, as there are no similar ones, it is judged that there is no combination in similarity. Then, as data on the top side, a striped patch 1502 is selected, and a similar comparison processing is performed. This time, as the spatial frequency response of the striped patch 1502 is similar to (or the closest to) that of the striped patch 1511 on the back side, it is judged that the striped patch 1502 on the top side and the striped patch 1511 on the back side are of a combination of similarity. Similar comparison processings are repeated up to a striped patch 1505 on the top side. As a result, four combinations of similarity are obtained. Each of the combinations contains a difference of 10% in spatial frequency response, as shown in FIG. 15. Accordingly, a result is obtained that the spatial frequency responses on the top side are 10% higher than the spatial frequency responses on the back side. In the present embodiment, all the four combinations contains the same difference of 10%, however, when different differences are obtained, a result calculated by a statistic method, such as the average value, central value, or the like thereof, may be concluded to be the difference between the top side and the back side. Corresponding to the difference in the obtained spatial frequency response between the front and back sides, a calibration amount is calculated by the method described in the first embodiment, and calibration is performed.

Figure 16:
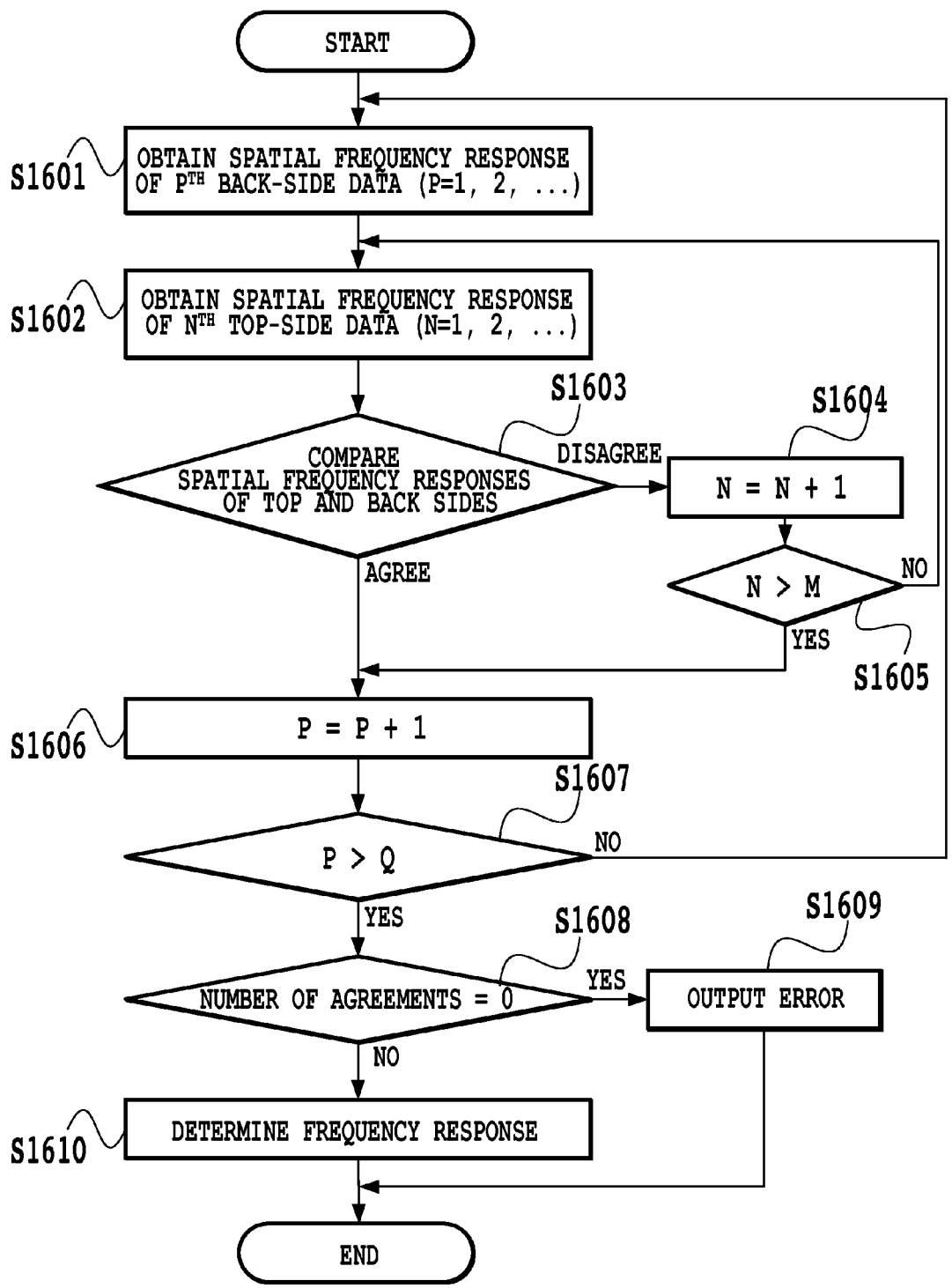
FIG. 16 is a flowchart of comparison of the spatial frequency responses of the front and back sides in accordance with the present embodiment.

A processing flow of the foregoing example is shown in FIG. 16. In step 1601, the CPU 101 obtains spatial frequency responses of the back side data. At this time, as spatial frequency conversion is performed plural times on the back side data, spatial frequency responses for the number of times Q of the conversion are sequentially obtained. First, the CPU 101 obtains the spatial frequency response of the first data.

In step 1602, the CPU 101 obtains the spatial frequency responses of the top side data. At this time, as spatial frequency conversion is performed on the top side data, spatial frequency responses for the number of times M are sequentially obtained. First, the CPU 101 obtains the spatial frequency response of the first data.

In step 1603, the CPU 101 compares the spatial frequency responses obtained in step 1601 and step 1602. If the spatial frequency responses agree with each other as a result of the comparison, then the process proceeds to step 1606 and the trial count on the back side is incremented by one. If the spatial frequency responses disagree with each other, then the process proceeds to step 1604 and the trial count N on the top side is incremented by one.

In step 1605, the CPU 101 compares whether the trial count N is greater than the number of times M of the performance of the foregoing spatial frequency conversion. If the trial count is smaller than or equal to M, then the process returns to step 1602, and if greater than M, then it is concluded that an appropriate result was not obtained, the process proceeds to step 1606 and the CPU 101 increments the trial count on the back side.

In step 1607, the CPU 101 compares whether the trial count on the back side is greater than the number of times Q of performing the foregoing spatial frequency conversion. If the trial count is smaller than or equal to Q, then the process returns to step 1601, and if greater, then the process proceeds to step 1608.

in step 1608, the CPU 101 judges whether the number of agreements as a result of comparison obtained in step 1603 is zero or not. If zero, then the process proceeds to step 1609, performs error output, and ends. If not zero, then the process proceeds to step 1610.

In step 1610, the CPU 101 determines a final spatial frequency response from the resulted plural spatial frequency responses in agreement. For example, as shown in FIG. 15, when four agreements are obtained among five trial times, and if the differences in response between the front and back sides are all the same, the fact that there is a difference of 10% in spatial frequency response between the front and back sides is detected with high accuracy. For example, though not shown, assuming that one out of four is a combination that does not contain a difference of 10%, in which the patch 1504 agrees with the patch 1512 for example, it means that three combinations have been detected to contain a difference of 10% and one combination has been detected to contain a difference of 20%. In this case, the CPU 101 may adopt the average of the four to judge the difference to be 12.5%, or may adopt the result of the three in common to judge the difference to be 10%. The judgment method may be decided depending on the number of times of trial, and if the number of times of trial is great, judgment may be made excluding the greatest value and the smallest value, for example.

In such a manner, the top side data and back side data having been subjected to spatial frequency conversion are compared so as to obtain the response amounts of similar spatial frequencies. If the process ends normally, then the CPU 101 determines a calibration amount, based on the response amount and by the foregoing method. If a response amount cannot be obtained, then the CPU 101 outputs an error and again performs a similar processing or the like. In this case, a calibration amount is not calculated.

In the present embodiment, the description has been made with an example where judgment is made depending on agreement or disagreement, however, it is not necessary to make judgment depending on perfect agreement or disagreement. For example, instead of agreement, closeness may be considered to be agreement. Otherwise, when closeness has been found, one more trial may be made, and a nearer one of the two results may be selected. Further, a value obtained from the weighted average of the two results may be considered to be the result.

According to the processing shown in FIGS. 15 and 16, each of the first and second spatial frequency conversion units performs the spatial frequency conversion, respectively using plural filters having different spatial frequency responses. The CPU 101 calculates a calibration amount by a statistic method from a difference/differences between spatial frequency responses calculated from the spatial frequency conversions performed using the respective filters.

In such a manner, in comparison between the spatial frequency responses on the front and back sides, the accuracy is improved by increasing the number of combinations for comparison. As a result, because patches output from a printer are used to calculate spatial frequency response characteristics, this calculation can be performed at anytime and for any occasion. For example, such calculation can be performed when the present image processing apparatus has been installed at a user's site, or when the environment has been changed at the user's site. As patches output from a printer are used, the timing of performing this calculation is not limited. Further, although there may be a concern about the stability or the like of the printer, the effect of the variation in the quality of performance of the printer can be eliminated by printing patches of plural spatial frequency response characteristics, selecting reliable patches from those printed out from the printer, and calculating the spatial frequency responses.

In such a manner, the spatial frequency responses on the front and back sides can be easily detected. Consequently, the difference in spatial frequency response can be eliminated, and the difference in sharpness, results of judgment processing, color taste, and the like between the front and back sides can be reduced.

Third Embodiment

The methods of adjusting spatial frequency responses on the front and back sides to each other described in the first and second embodiments obtain the relative difference between the spatial frequency responses on the front and back sides and relatively adjust the spatial frequency responses to each other. Accordingly, even when the spatial frequency response on the top side or the back side shows a value exceeding a practical range, it is possible that the spatial frequency response characteristics on the front and backsides agree with each other in a range exceeding the practical range because the adjustment is made relatively.

Therefore, in the present embodiment, it will be described about a method of avoiding calibration exceeding a practical range, by obtaining spatial frequency response characteristics in advance with respect to striped patches, referring to FIGS. 17 and 18.

<Description of Comparison Method of Spatial Frequency Responses on Front and Back Sides in the Present Embodiment>

Before the image processing apparatus 100 is installed beside a user, at the time of assembling at a factory for example, the spatial frequency characteristics of top side image data and back side image data are measured in advance, using a regular measurement chart. Herein, the top side image data is image data having been read by the first image reading section 226, and the back side data is image data having been read by the second image reading section 228. A measurement result is stored in the RAM 103, for example, in the image processing apparatus 100. Further, at the same time, a print image 400 as a print output of striped patches is measured, and stored in the RAM 103. Further, the measured results of the both are made associated with each other. For example, the spatial frequency response of the patch 411 of 4 [lp/mm] and the spatial frequency response of 4 [lp/mm] measured by a regular measurement chart are made associated with each other in advance. Likewise, association is made and stored also for the patch 412 of 6 [lp/mm], patch 413 of 8 [lp/mm], and patch 414 of 10 [lp/mm].

Concrete description will be made, referring to FIG. 17. For example, it will be assumed that a top-side image data 1700 is the patch 413 of 8 [lp/mm] and the spatial frequency response measured by a measurement chart is 50%. Similarly to the foregoing embodiment, edge enhancement and smoothing are performed in two steps respectively on the striped patch 1700 by the spatial frequency calibration section 1905 (the first spatial frequency conversion unit). A striped patch 1701 is a product by edge enhancement by 20%, and a striped patch 1702 is a product by edge enhancement by 10%. In contrast, a striped patch 1704 is a product by smoothing by 10%, and a striped patch 1705 is a product by smoothing by 20%. A striped patch 1703 subjected to nothing is used for comparison, and image data of spatial frequency responses in five steps are generated from the image data of a single striped patch.

From the result of the association between the measurement chart and the spatial frequency responses of the print image 400 stored in the RAM 103, it is recognized that the spatial frequency response of the top-side image data 1700 is 50%. Accordingly, the spatial frequency response of the striped patch 1701 subjected to edge enhancement of 20% becomes 60%, and the striped patch 1702 subjected to edge enhancement of 10% becomes 55%. The striped patch 1704 subjected to smoothing of 10% becomes 45%, and the striped patch 1705 subjected to smoothing of 20% becomes 40%.

For example, it will be assumed that a back-side image data 1710 is image data having been subjected to spatial frequency conversion processing of 0% by the spatial frequency calibration section 1415 (the second spatial frequency conversion unit). In this case, it will be assumed that a comparison with the top-side image data by the method described in the first embodiment results in that the spatial frequency response of the back-side image data 1710 is similar to that of the striped patch 1704. Consequently, since the spatial frequency response of the striped patch 1709 is 45%, the spatial frequency response of the back-side image data 1710 is 45%. That is, the spatial frequency response of the back-side image data 1710 to be inherently 50% results in 45%.

Further, it will be assumed that a back-side image data 1711 is image data having been subjected to spatial frequency conversion processing of 0% by the spatial frequency calibration section 1415. In this case, it will be assumed that a comparison with the top-side image data results in that the spatial frequency response of the back-side image data 1711 is similar to that of the striped patch 1705. Consequently, since the spatial frequency response of the striped patch 1705 is 40%, the spatial frequency response of the back-side image data 1711 is 40%. That is, the spatial frequency response of the back-side image data 1711 to be inherently 50% result in 40%.

For example, if a condition that calibration is not performed in a case of a ratio smaller than 45% (in other word, setting the threshold of performing calibration to 95%) is added, then the back-side data 1710 is an object of calibration, while the back-side data 1711 is not an object of calibration. That is, the threshold is set to a spatial frequency response considered to exceed the practical range, and calibration is not performed when the spatial frequency response characteristic of either the top side or back side exceeds the threshold.

Figure 18:
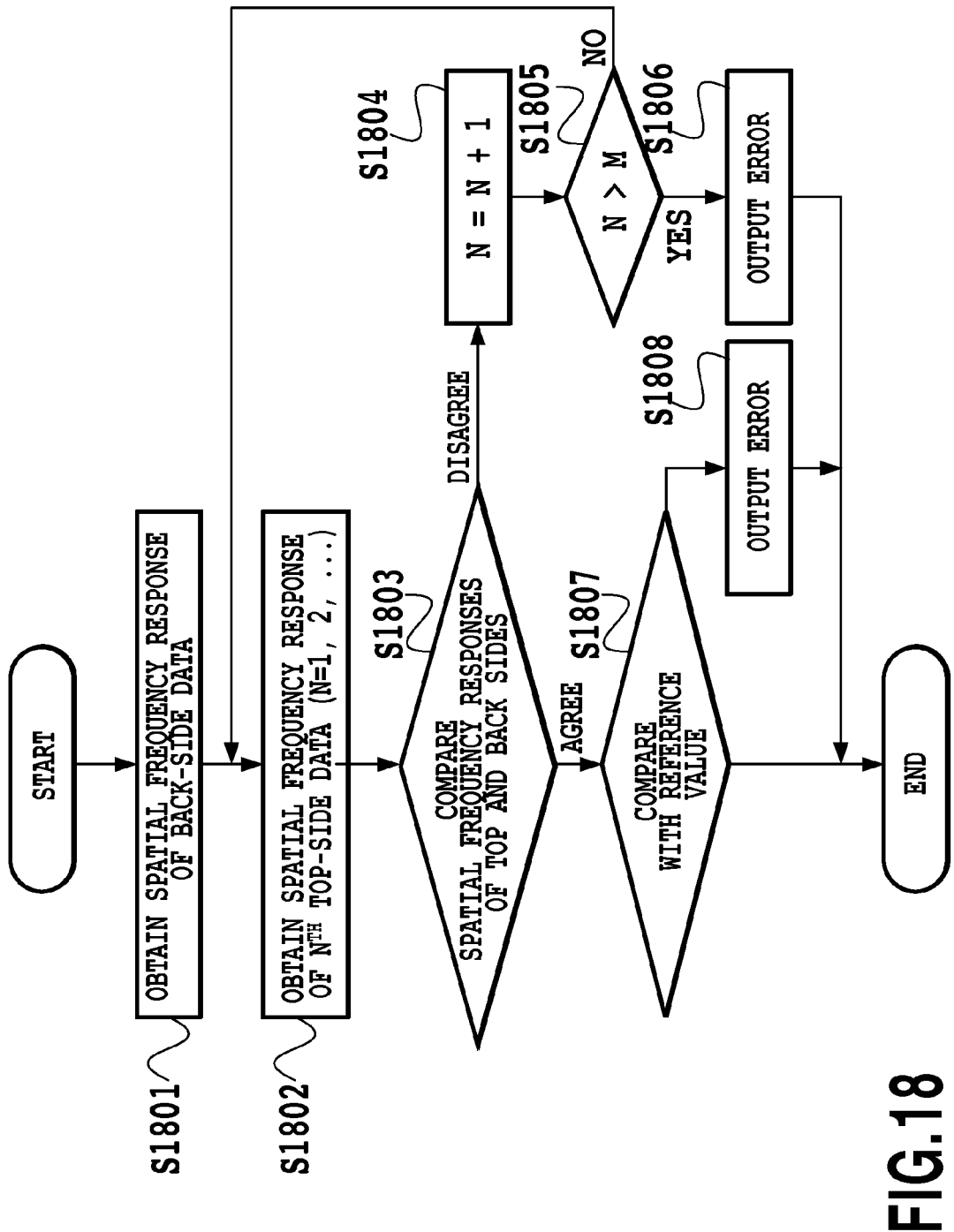
FIG. 18 is a flowchart of comparison of the spatial frequency responses of the front and back sides in accordance with the present embodiment.

A processing flow chart of the foregoing example is shown in FIG. 18. As the processing in steps 1801, 1802, and 1804-1806 are similar to the processing in steps 1301, 1302, and 1309-1306 in FIG. 13, description thereof will be omitted, and only steps different from those in FIG. 13 will be described.

In step 1803, the CPU 101 compares the spatial frequency responses obtained in step 1801 and in step 1802. If the comparison results in agreement, then the process proceeds to step 1807. If it results in disagreement, then the process proceeds to step 1804 and the trial count N is incremented by one.

In step 1807, the CPU 101 compares data stored in the RAM 103 as a result of the association between the measurement chart and the print image 400, and the spatial frequency response judged to agree in step 1803. If the result of the comparison is within a predetermined range (threshold), the process ends. If the process normally ends, the CPU 101 determines a calibration amount, based on the response amount and by the method described above. If the result is out of the range, then the process proceeds to step 1808, outputs an error, and ends. In this case, a calibration amount is not calculated.

Although, in the present embodiment, an example where judgment is made depending on agreement or disagreement, it is not necessary to make judgment depending on perfect agreement or disagreement. For example, instead of agreement, closeness may be considered to be agreement. Otherwise, when closeness has been found, one more trial may be made, and a nearer one of the two results may be selected. Further, a value obtained from the weighted average of the two results may be considered to be the result.

Further, in the present embodiment, spatial frequency conversion processing is performed plural times on the top-side image data, and the spatial frequency responses of the results of the respective processings are compared with the spatial frequency response of the back side image data (S1803). Thereafter, using the comparison result, it is judged whether the spatial frequency response of the back side image data is within the threshold or not (S1807). Without being limited to this method and as a modified example, the processings on the top side image data and the back side data may be reversed to judge whether or not the spatial frequency response of the top side image data is within the threshold.

Figure 17:
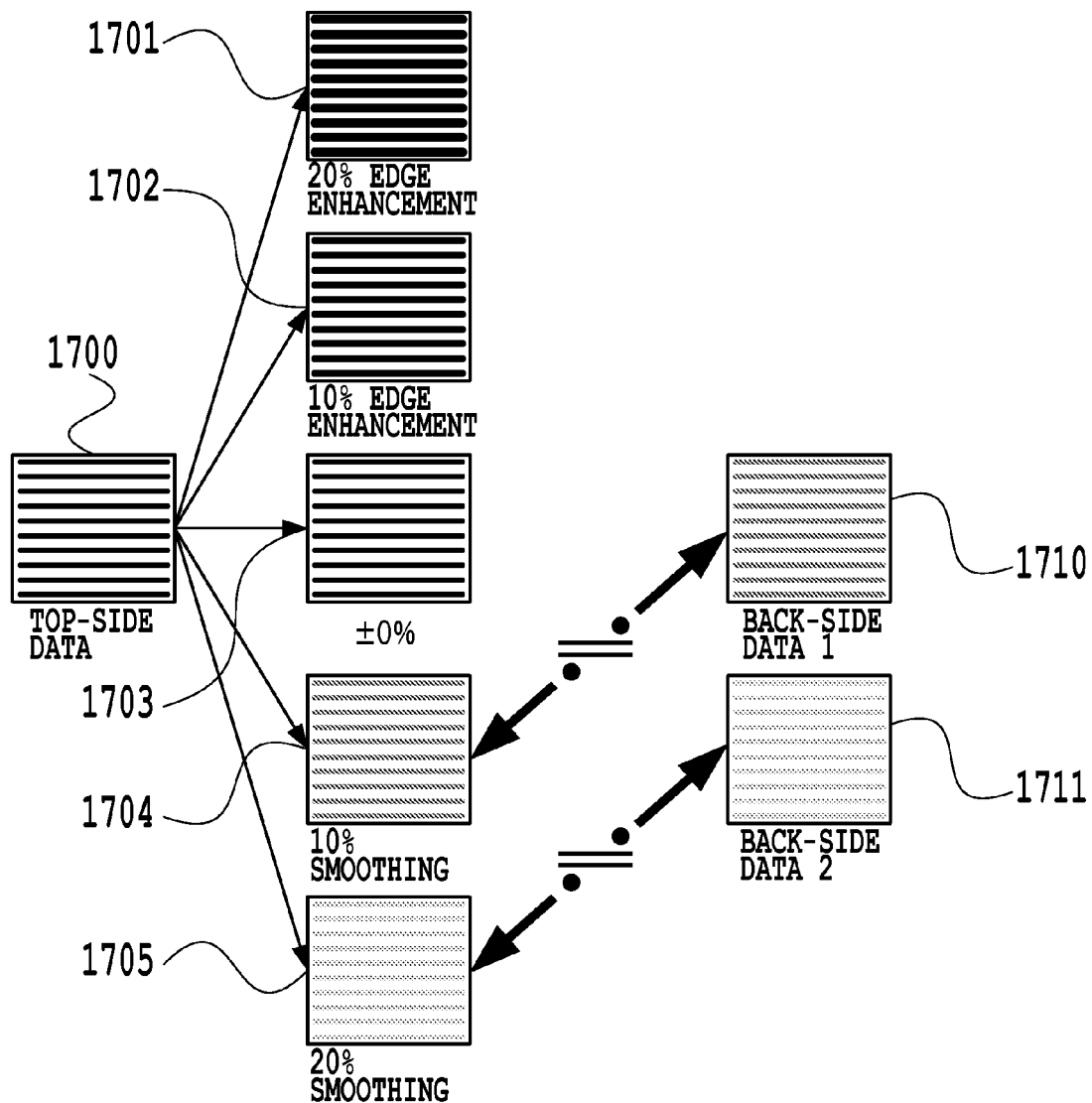
FIG. 17 shows an example of spatial frequency responses of the front and back sides and a method of comparison in accordance with the present embodiment.

According to the processing shown in FIGS. 17 and 18, it is judged whether or not the spatial frequency response of read image having been subjected to conversion by the first or second spatial frequency conversion unit exceeds a predetermined threshold value. When an excess of the threshold value is judged, then a calibration amount is not calculated.

In such a manner, the top side data and back side data having been subjected to spatial frequency conversion are compared so as to obtain the response amounts of similar spatial frequencies. If a response amount is not obtained, then an error is output and the process is terminated.

Although, in the present embodiment, an example where judgment is made depending on agreement or disagreement, it is not necessary to make judgment depending on perfect agreement or disagreement. For example, instead of agreement, closeness may be considered to be agreement. Otherwise, when closeness has been found, one more trial may be made, and a nearer one of the two results may be selected. Further, a value obtained from the weighted average of the two results may be considered to be the result.

In such a manner, in comparison of the frequency responses on the tops and back sides, by measuring an absolute spatial frequency response characteristic in advance, calibration exceeding a practical range can be avoided.

Other Embodiments

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structure and functions.

This application claims the benefit of Japanese Patent Application No. 2009-039888, filed Feb. 23, 2009, which is hereby incorporated by reference herein in its entirety.

What is claimed is:

1. An image processing apparatus, comprising:
   a printing unit configured to print a plurality of patch images having different frequency characteristics;
   a first reading unit configured to read the plurality of patch images printed by the printing unit, the patch images having the different frequency characteristics;
   a first spatial frequency conversion unit configured to perform spatial frequency conversion on the plurality of patch images having been read by the first reading unit;
   a determination unit configured to determine a patch image to be used for spatial frequency correction among the plurality of patch images based on amounts of change in respective spatial frequency responses of the plurality of patch images between before and after the spatial frequency conversion performed by the first spatial frequency conversion unit;
   a second reading unit configured to read the plurality of patch images printed by the printing unit;
   a second spatial frequency conversion unit configured to perform spatial frequency conversion on the plurality of images having been read by the second reading unit; and
   a calculation unit configured to calculate correction amounts for conversion by the first and second spatial frequency conversion units, according to a difference between (a) a spatial frequency response of the patch image determined by the determination unit among the plurality of patch images having been read by the first reading unit and having been converted by the first spatial frequency conversion unit, and (b) a spatial frequency response of the patch image determined by the determination unit among the plurality of patch images having been read by the second reading unit and having been converted by the second spatial frequency conversion unit,
   the calculation unit calculating the correction amounts such that both spatial frequency responses become comparable with each other.

2. The image processing apparatus of claim 1,
   wherein each of the first and second spatial frequency conversion units performs the spatial frequency conversion, respectively using a plurality of filters having different spatial frequency response characteristics, and
   wherein the calculation unit calculates the correction amounts, according to a plurality of the differences calculated from a result of the spatial frequency conversion having been performed using the respective filters having the different spatial frequency response characteristics.

3. The image processing apparatus of claim 1, further comprising:
   a judgment unit configured to judge whether or not the spatial frequency response of the patch image having been converted by the first or second spatial frequency conversion unit exceeds a predetermined threshold value,
   wherein the calculation unit does not calculate the correction amounts when the judgment unit has judged that the threshold value is exceeded.

4. The image processing apparatus of claim 1, wherein the plurality of patch images printed by the printing unit are images having striped lines disposed along a main scanning direction or sub-scanning direction.

5. The image processing apparatus of claim 1, wherein each of the spatial frequency conversions performed by the first or second spatial frequency conversion unit is edge enhancement processing.

6. The image processing apparatus of claim 1, wherein each of the spatial frequency conversions performed by the first or second spatial frequency conversion unit is smoothing processing.

7. The image processing apparatus of claim 1, wherein the determination unit determines, among the plurality of patch images, a patch image whose amount of change in the spatial frequency response due to the spatial frequency conversion by the first spatial frequency conversion unit is comparable with an amount of change in the spatial frequency response expected with the spatial frequency conversion by the first spatial conversion unit.

8. The image processing apparatus of claim 1, wherein either the first or second spatial frequency conversion unit performs the spatial frequency conversion.

9. A method, comprising:
   a printing step of printing a plurality of patch images having different frequency characteristics;
   a first reading step of reading a plurality of patch images printed by the printing step, the patch images having the different frequency characteristics;
   a first spatial frequency conversion step of performing spatial frequency conversion on the plurality of patch images having been read by the first reading step;
   a determination step of determining a patch image to be used for spatial frequency correction among the plurality of patch images based on amounts of change in respective spatial frequency responses of the plurality of patch images between before and after the spatial frequency conversion performed by the first spatial frequency conversion step;
   a second reading step of reading the plurality of patch images rib printed by the printing step;
   a second spatial frequency conversion step of performing spatial frequency conversion on the plurality of images having been read by the second reading step;
   a calculation step of calculating correction amounts for conversion by the first and second spatial frequency conversion steps, according to a difference between (a) a spatial frequency response of the patch image determined by the determination step among the plurality of patch images having been read by the first reading step and having been converted by in the first spatial frequency conversion step, and (b) a spatial frequency response of the patch image that has been determined by the determination step among the plurality of patch images having been read by the second reading step and having been converted the second spatial frequency conversion step,
   the calculation step calculating the correction amounts such that both spatial frequency responses become comparable with each other.

10. The method of claim 9,
   wherein each of the first and second spatial frequency conversion step performs the spatial frequency conversion, respectively using a plurality of filters having different spatial frequency response characteristics, and
   wherein the calculation step calculates the correction amounts by a statistic method, according to a plurality of differences calculated from a result of the spatial frequency conversion having been performed using the respective filters having the different spatial frequency response characteristics.

11. The method of claim 9, further comprising:
   a judgment step of judging whether or not the spatial frequency response of the patch image having been converted by the first or second spatial frequency conversion step exceeds a predetermined threshold value,
   wherein the calculation step does not calculate the correction amounts when the judgment step has judged that the threshold value is exceeded.

12. A non-transitory computer-readable recording medium having a computer-executable program stored thereon for performing a method in an image processing apparatus, the method comprising the steps of:
   a printing step of printing a plurality of patch images having different frequency characteristics;
   a first reading step of reading a plurality of patch images printed by the printing step, the patch images having the different frequency characteristics;
   a first spatial frequency conversion step of performing spatial frequency conversion on the plurality of patch images having been ready by the first reading step;
   a determination step of determining a patch image to be used for spatial frequency correction among the plurality of patch images based on amounts of change in respective spatial frequency conversion performed by the first spatial frequency conversion step;
   a second reading step of reading the plurality of patch images printed by the printing step;
   a second spatial frequency conversion step of performing spatial frequency conversion on the plurality of images having been read by the second reading step;
   a calculation step of calculating correction amounts for conversion by the first and second spatial frequency conversion steps, according to a difference between (a) a spatial frequency response of the patch image determined by the determination step among the plurality of patch images having been read by the first reading step and having been converted by the first spatial frequency conversion step, and (b) a spatial frequency response of the patch image determined by the determination step among the plurality of patch images having been read by the second reading step and having been converted by the second spatial frequency conversion step,
   the calculation step calculating the correction amounts such that both spatial frequency responses become comparable with each other.

* * * * *